United States Patent
Watanabe et al.

(10) Patent No.: US 6,538,845 B1
(45) Date of Patent: Mar. 25, 2003

(54) THIN-FILM MAGNETIC HEAD HAVING A HIGH SPECIFIC RESISTANCE LAYER

(75) Inventors: Toshinori Watanabe, Niigata-ken (JP); Mitsuo Kawasaki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 99 days.

(21) Appl. No.: 09/604,606

(22) Filed: Jun. 27, 2000

(30) Foreign Application Priority Data

Jun. 28, 1999 (JP) .......................................... 11-181234
Mar. 27, 2000 (JP) ...................................... 2000-086101

(51) Int. Cl.$^7$ ............................................. G11B 5/147
(52) U.S. Cl. ...................................................... 360/126
(58) Field of Search ............................... 360/318, 317, 360/126

(56) References Cited

U.S. PATENT DOCUMENTS

| | | | |
|---|---|---|---|
| 5,224,002 A | 6/1993 | Nakashima et al. | 360/126 |
| 5,590,008 A | 12/1996 | Tanabe et al. | 360/126 |
| 5,606,478 A | 2/1997 | Chen et al. | 360/126 |
| 5,751,528 A | 5/1998 | Nepela et al. | 360/126 |
| 5,812,350 A | 9/1998 | Chen et al. | 360/126 |
| 5,850,325 A | 12/1998 | Miyauchi et al. | 360/126 |
| 5,864,450 A | 1/1999 | Chen et al. | 360/317 |
| 5,920,979 A | 7/1999 | Nepela et al. | 29/603.13 |
| 6,034,847 A * | 3/2000 | Komuro et al. | 360/126 |
| 6,038,110 A * | 3/2000 | Aboaf et al. | 360/126 |
| 6,118,629 A * | 9/2000 | Huai et al. | 360/126 |
| 6,125,010 A * | 9/2000 | Keel et al. | 360/126 |
| 6,198,597 B1 * | 3/2001 | Tateyama et al. | 360/126 |
| 6,301,075 B1 * | 10/2001 | Sato | 360/126 |
| 6,337,783 B1 * | 1/2002 | Santini | 360/317 |
| 6,353,511 B1 * | 3/2002 | Shi et al. | 360/126 |
| 6,369,984 B1 * | 4/2002 | Sato | 360/126 |

* cited by examiner

Primary Examiner—Jefferson Evans
(74) Attorney, Agent, or Firm—Brinks Hofer Gilson & Lione

(57) ABSTRACT

A high-specific-resistance layer is formed on a soft magnetic layer of an upper core layer in a thin-film magnetic head. The high-specific-resistance layer has a specific resistance which is higher than the specific resistance of the softer magnetic layer. This high-specific-resistance layer can reduce eddy current loss which is generated as the recording frequency increases. The thin-film magnetic head is suitable for high recording frequencies.

121 Claims, 6 Drawing Sheets

THIN-FILM MAGNETIC HEAD HAVING A HIGH SPECIFIC RESISTANCE LAYER

BACKGROUND OF THE INVENTION

1. Field of the Invention

The present invention relates to thin-film magnetic heads which are mounted in, for example, hard disk drives. In particular, the present invention relates to thin-film magnetic heads suitable for higher recording densities and higher recording frequencies and relates to methods for making the same.

2. Description of the Related Art

FIG. 9 is an enlarged cross-sectional view of a conventional thin-film magnetic head. This thin-film magnetic head is an inductive head for writing. A MR head for reading may be formed below the inductive head. The thin-film magnetic head has a lower core layer 1 formed of a conventional magnetic material such as permalloy. A gap layer 2 of alumina or the like is formed on the lower core layer 1, and an insulating layer 3 composed of polyimide or a resist material is formed on the gap layer 2.

A coil layer 4 having a spiral pattern is formed on the insulating layer 3. The coil layer 4 is formed of a nonmagnetic conductive material having low electrical resistance, such as copper. The coil layer 4 is covered with an insulating layer 5 formed of polyimide or a resist material. An upper core layer 6 formed of a magnetic material such as permalloy is plated on the insulating layer 5.

The upper core layer 6 faces the lower core layer 1 at a surface opposing a recording medium (air bearing surface (ABS)) and these layers are separated by the gap layer 2. The gap layer 2 forms a magnetic gap with a magnetic gap length GL1 which applies a recording magnetic field to a recording medium. A base end 6b of the upper core layer 6 is magnetically coupled with the lower core layer 1.

In this inductive head, the coil layer 4 yields a recording magnetic field by a recording current flowing therein toward the upper core layer 6 and the lower core layer 1. A magnetic signal is recorded on a recording medium, such as a hard disk, by a fringing magnetic field between the lower core layer 1 and the upper core layer 6 at the magnetic gap.

With trends toward higher recording densities and higher recording frequencies, the saturation magnetic flux density $B_s$ and the specific resistance $\rho$ of the upper core layer 6 must be increased. The specific resistance $\rho$ is an important magnetic characteristic in order to reduce eddy current loss at high-frequencies. However, NiFe alloys, which are generally used in the upper core layer 6, have at most $50\,\mu\Omega\cdot\text{cm}$. As a result, in conventional thin-film magnetic heads, eddy current loss is insufficiently suppressed at high-frequencies.

The high saturation magnetic flux density $B_s$ is a magnetic characteristic which is essential for improved recording density. When the upper core layer 6 is formed of a magnetic material having high saturation magnetic flux density $B_s$ which is suitable for higher recording densities and higher recording frequencies, the specific resistance $\rho$ is further decreased and thus the eddy current loss is unintentionally increased. When the upper core layer 6 is formed of a magnetic material having high specific resistance $\rho$, the saturation magnetic flux density $B_s$ will be be sacrificed to some extent.

The following conventional thin-film magnetic head provides an improved saturation magnetic flux density $B_s$. In this head, the upper core layer 6 shown in FIG. 9 has two films, that is, a high $B_s$ film having high saturation magnetic flux density $B_s$ and a conventional permalloy film (a NiFe alloy film) in order to be suitable for high recording densities. The lower core layer 1 is composed of only a permalloy film.

Since a recording magnetic field is generated from a portion which is near the gap layer 2 of a leading edge 6a of the upper core layer 6 toward the lower core layer 1, the high $B_s$ film is believed to intensively generate the magnetic field near the gap and this is suitable for future higher recording densities.

This double-layer structure can improve recording characteristics compared to the above single upper core layer 6 composed of permalloy. However, a recording magnetic field formed between the high $B_s$ film and the lower core layer 1 is affected by a magnetic field from the recording medium, and an intensive recording magnetic field will not be concentrated near the gap. As a result, this structure cannot effectively improve an overwrite (OW) characteristic and a non-linear transition shift (NLTS) characteristic, as described in detail below.

The NLTS exhibits a phase lead by nonlinear distortion of a magnetic field generated at the magnetic gap between the upper and lower core layers 1 and 6, respectively, which is caused by a recorded magnetic field from magnetic signals recorded immediately before on the recording medium toward the head.

In order to evaluate the OW characteristic, low-frequency signals are recorded and then high-frequency signals are overwritten. The OW characteristic is evaluated by a decrease in residual output of the low-frequency recorded signals after the high-frequency overwriting compared to the recorded signals after low-frequency recording.

Moreover, this double layer structure does not effectively reduce eddy current loss which is caused by increased recording frequencies.

SUMMARY OF THE INVENTION

It is an object of the present invention to provide a thin-film magnetic head including an upper core layer and a lower core layer which have improved structures and which comprise improved magnetic materials.

It is another object of the present invention to provide a thin-film magnetic head which is suitable for higher recording densities and higher recording frequencies.

It is another object of the present invention to provide a method for making a thin-film magnetic head.

According to a first aspect of the present invention, a thin-film magnetic head includes a gap layer; a magnetic pole layer optionally provided on one face of the gap layer; a lower core layer; an upper core layer, the lower core layer and the upper core layer facing each other and being separated by the gap layer; and a coil layer for applying a recording magnetic field to the lower core layer and the upper core layer. At least one of the lower core layer and the upper core layer includes a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer.

In the present invention, at least one of the lower core layer and the upper core layer includes the soft magnetic layer and at least one high-specific-resistance layer formed on at least one of the upper face and the lower face of the soft magnetic layer. This structure can reduce eddy current loss which is generated by increased recording frequencies. Thus, this thin-film magnetic head is suitable for future higher recording frequencies.

In the present invention, the high-specific-resistance layer is formed on the core layer, because eddy current loss is particularly generated in the vicinity of the core layer by skin effects.

Preferably, the high-specific-resistance layer is formed on the upper face of the upper core layer and is covered with a protective film. The protective film can prevent cracks of the high-specific-resistance layer which is generally formed of a fragile material.

Preferably, the protective film is formed of one of a NiFe alloy, elemental Ni, and a NiP alloy.

Preferably, the high-specific-resistance layer is formed at a portion other than a magnetic path-forming region toward the gap layer on at least one of the lower face of the upper core layer and the upper face of the lower core layer.

If the high-specific-resistance layer is formed in the magnetic path-forming region, a recording magnetic field generated in the vicinity of the gap is reduced. When the high-specific-resistance layer is formed on the upper face of the upper core layer or under the lower face of the lower core layer, such a limitation is unnecessary.

Preferably, the magnetic pole layer is a high $B_s$ layer having a saturation magnetic flux density $B_s$ which is higher than the saturation magnetic flux density $B_s$ of the soft magnetic layer.

This configuration facilitates generation of a higher recording magnetic field in the vicinity of the gap. Thus, the thin-film magnetic head has improved recording resolution and is suitable for future higher recording densities.

In this configuration, the thin-film magnetic head preferably includes an insulating layer formed on the lower core layer, wherein the insulating layer has a groove having a width in the track width direction extending in the height direction from an opposing face opposing a recording medium, and the groove includes the high $B_s$ layer and the gap layer therein.

This configuration is suitable in view of trends toward narrow track widths and is particularly suitable for a track width of 1.0 μm or less and preferably 0.7 μm or less. The high $B_s$ layer formed in the groove can concentrate the recording magnetic field in the vicinity of the gap. As a result, higher recording densities can be achieved.

Preferably, the soft magnetic layer has a saturation magnetic flux density $B_s$ which is higher than the saturation magnetic flux density $B_s$ of the high-specific-resistance layer. The soft magnetic layer having a higher saturation magnetic flux density $B_s$ can concentrate the recording magnetic field in the vicinity of the gap. As a result, higher recording densities can be achieved.

Preferably, the soft magnetic layer and the high-specific-resistance layer are composed of magnetic materials containing the same components including Fe in at least one of the upper core layer and the lower core layer, and the Fe content in the soft magnetic layer is higher than the Fe content in the high-specific-resistance layer.

Preferably, the soft magnetic layer and the high $B_s$ layer are composed of magnetic materials containing the same components including Fe, and the Fe content in the high $B_s$ layer is higher than the Fe content in the soft magnetic layer.

The increased Fe content causes an increased saturation magnetic flux density $B_s$.

Preferably, at least one of the soft magnetic layer, the high-specific-resistance layer, and the high $B_s$ layer comprises a soft magnetic material having a composition which is represented by $Co_xFe_y$ and satisfies the relationships $20 \leq x \leq 40$ and $60 \leq y \leq 80$, or $86 \leq x \leq 92$, $8 \leq y \leq 14$, and $x+y=100$, wherein x and y represent Co and Fe contents, respectively, by atomic percent.

Preferably, at least one of the soft magnetic layer, the high-specific-resistance layer, and the high $B_s$ layer comprises a soft magnetic material having a composition which is represented by $Co_xFe_yNi_z$ and satisfies the relationships $0.1 \leq x \leq 15$, $38 \leq y \leq 60$, $40 \leq z \leq 62$, and $x+y+z$ 100, wherein x, y, and z represent Co, Fe, and Ni contents, respectively, by percent by weight.

Preferably, at least one of the soft magnetic layer, the high-specific-resistance layer, and the high $B_s$ layer comprises a soft magnetic material having a composition which is represented by $Co_xFe_yNi_zX_w$ and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

Preferably, at least one of the soft magnetic layer and the high $B_s$ layer comprises the soft magnetic material.

Preferably, at least one of the soft magnetic layer, the high-specific-resistance layer, and the high $B_s$ layer comprises a soft magnetic material having a composition which is represented by $Ni_xFe_y$ and satisfies the relationships $10 \leq x \leq 70$, $30 \leq y \leq 90$, and $x+y=100$ wherein x and y represent Ni and Fe contents, respectively, by atomic percent.

Preferably, at least one of the soft magnetic layer, the high-specific-resistance layer, and the high $B_s$ layer comprises a soft magnetic material having a composition which is represented by $Fe_aM_bO_c$ and satisfies the relationships $50 \leq a \leq 70$, $5 \leq b \leq 30$, $10 \leq c \leq 30$, and $a+b+c=100$, wherein a, b, and c represent Fe, M, and O contents, respectively, by atomic percent, and M is at least one element selected from the group consisting of Hf, Zr, Ti, V, Nb, Ta, Cr. Mo, and W.

Preferably, the high-specific-resistance layer comprises the soft magnetic material.

Preferably, the high-specific-resistance layer comprises a soft magnetic material comprising Ni, Fe, and N and having an average crystal grain size of not more than 80 Å, the Fe content being at least 30 percent by weight. In this case, the centerline average roughness ($R_a$) of the surface of the soft magnetic material is not more than 120 Å.

Preferably, the high-specific-resistance layer comprises a soft magnetic material having a composition which is represented by $Ni_xFe_yNb_z$, wherein x, y, and z indicates atomic percent and satisfy the relationships $76 \leq x \leq 84$, $8 \leq y \leq 15$, $5 \leq z \leq 12$, and $x+y+z=100$.

Preferably, the high-specific-resistance layer comprises one of NiFeP and FeNiPN.

Preferably, the soft magnetic layer and the high $B_s$ layer comprise a soft magnetic material having a composition which is represented by $Co_xZr_yNb_z$ and satisfies the relationships $1.5 \leq y \leq 13$, $6.5 \leq z \leq 15$, $1 \leq (y/z) \leq 2.5$, and $x+y+z=100$, wherein x, y, and z represent Co, Zr, and Nb contents, respectively, by atomic percent.

Preferably, the soft magnetic layer and the high $B_s$ layer comprise a soft magnetic material having a composition which is represented by $Co_xZr_yNb_z$ and satisfies the relationships $1.5 \leq y \leq 13$, $6.5 \leq z \leq 15$, $1 \leq (y/z) \leq 2.5$, and $x+y+z=100$, wherein x, y, and z represent Co, Hf, and Nb contents, respectively, by atomic percent.

Preferably, at least one of the soft magnetic layer and the high $B_s$ layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

Preferably, at least one of the soft magnetic layer and the high $B_s$ layer comprises a soft magnetic material having a composition comprising at least one element T selected from Fe and Co as the major component, at least one element X selected from Si and Al, at least one element M selected from the group consisting of Ti, Zr, Hf, V, Ta, Mo, and W, at least one element Z selected from C and N, and at least one element Q selected from the group consisting of Cr, Re, Rh, Ni, Pd, Pt, and Au, the composition includes a crystalline.phase primarily composed of the element T, and a crystalline phase composed of at least one of carbide and nitride of the element M, and is composed of microcrystallites having an average crystal grain size of not more than 40 nm on the whole, wherein the ratio of the average crystal grain size d of the M carbide and the M nitride to the average crystal grain size D of the crystalline phase of the element T is in a range of $0.05 \leq d/D \leq 0.4$, and the composition is represented by the formula $T_aX_bM_cZ_dQ_e$, wherein a, b, c, d, and e represent atomic percent and satisfy the relationships $0 \leq b \leq 25$, $1 \leq c \leq 10$, $5 \leq d \leq 15$, $0 \leq e \leq 10$, and $a+b+c+d+e=100$.

Preferably, at least one of the soft magnetic layer and the high $B_s$ layer comprises a soft magnetic material having a composition comprising at least one element T selected from Fe and Co as the major component, Si, Al, at least one element M selected from the group consisting of Zr, Hf, Nb, and Ta, at least one element Z selected from C and N, and at least one element Q selected from the group consisting of Cr, Ti, Mo, W, V, Re, Ru, Rh, Ni, Pd, Pt, and Au, the composition includes a body centered cubic microcrystalline phase primarily composed of the element T and having an average crystal grain size of not more than 40 nm, wherein at least one element of Si and Al and the element Q are dissolved therein, and a crystalline phase of at least one of M carbide and M nitride which is precipitated at the grain boundaries of the microcrystalline phase, wherein the composition is represented by the formula $T_aSi_bAl_cM_dZ_eQ_f$, wherein a, b, c, d, e, and f represent atomic percent and satisfy the relationships $8 \leq b \leq 15$, $0 \leq c \leq 10$, $1 \leq d \leq 10$, $1 \leq e \leq 10$, $0 \leq f \leq 15$, and $a+b+c+d+e+f=100$.

Preferably, at least one of the soft magnetic layer and the high $B_s$ layer comprises a soft magnetic material having a composition which is represented by the formula $Ni_{1-x}Fe_x$, and has an average crystal grain size of not more than 105 Å, wherein the Fe content is in a range of 60 to 90 percent by weight. In this case, the centerline average roughness ($R_a$) of the surface of the soft magnetic film is preferably not more than 25 Å.

According to a second aspect of the present invention, a method is provided for making a thin-film magnetic head, including a gap layer, the gap layer optionally having a magnetic pole layer, a lower core layer, an upper core layer, the lower core layer and the upper core layer facing each other and being separated by the gap layer, and a coil layer for applying a recording magnetic field to the lower core layer and the upper core layer. The method includes forming the soft magnetic layer when at least one of the lower core layer and the upper core layer is formed, and forming a high-specific-resistance layer having a specific resistance which is higher than that of the soft magnetic layer on at least one of the lower face and the upper face of the soft magnetic layer, by adding an amino-based organic material to ≦ a plating bath containing Fe and Ni ions so that a soft magnetic material containing Fe, Ni, and N is deposited.

In the present invention, the soft magnetic material contains nitrogen (N) as a tertiary component in addition to magnetic elements Fe and Ni. This tertiary component improves the specific resistance ρ of the soft magnetic material. The thin-film magnetic head having a high-specific-resistance layer composed of this soft magnetic material exhibits reduced eddy current loss at future higher recording frequencies.

Preferably, the pH value of the plating bath is maintained at 1.8 or less.

Preferably, the amino-based organic material is at least one material selected from the group consisting of ethylenediamine (EDA), diethylenetriamine (DETA), triethylenetetramine (TETA), alanine (Ala), and glutamic acid (Glu).

Preferably, the soft magnetic layer of at least one of the lower core layer and the upper core layer comprises a NiFe alloy film, and the NiFe alloy film is formed by an electroplating process using a pulsed current.

The NiFe alloy formed by the electroplating process using the pulsed current exhibits an improved saturation magnetic flux density $B_s$. Thus, the thin-film magnetic head including a soft magnetic layer composed of this NiFe alloy is suitable for future higher recording densities.

Preferably, the NiFe alloy has a crystal grain size of not more than 105 Å and an Fe content in a range of 60 to 90 percent by weight. Preferably, the centerline average roughness ($R_a$) of the surface of the NiFe alloy film is not more than 25 Å.

DESCRIPTION OF THE PREFERRED EMBODIMENTS

Figure 1:
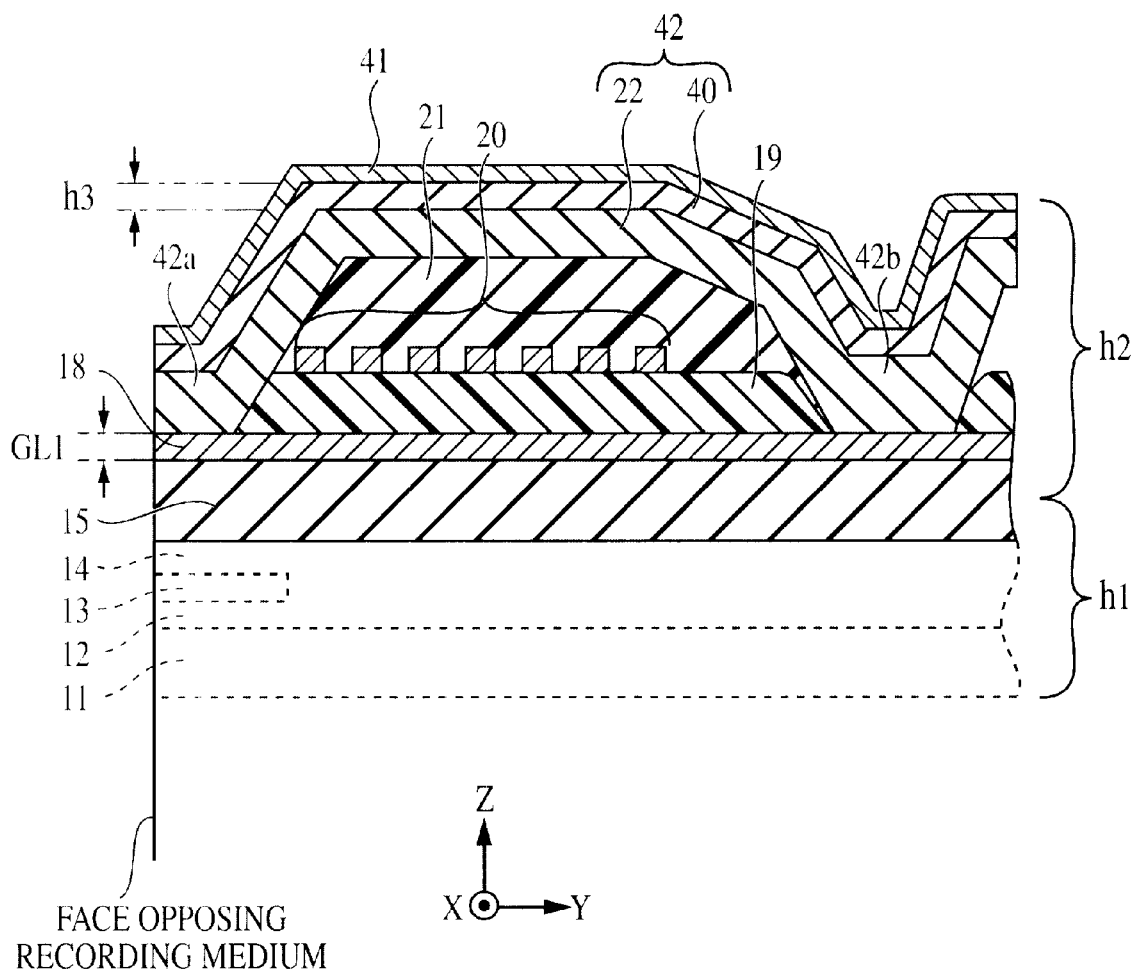
FIG. 1 is an enlarged cross-sectional view of a thin-film magnetic head according to a first embodiment of the present invention.

FIG. 1 is an enlarged cross-sectional view of a thin-film magnetic head according to a first embodiment of the present invention. This thin-film magnetic head is formed at a trailing edge of a slider of a floating head and is a composite thin-film magnetic head including a MR read head h1 and an inductive write head h2. The thin-film magnetic head in accordance with the present invention may be composed of only the inductive head.

In FIG. 1, the MR head h1 has a lower shielding layer 11 formed of a soft magnetic material. A lower gap layer 12 formed of a nonmagnetic material such as alumina ($Al_2O_3$) is formed on the lower shielding layer 11. A magnetoresistive element 13 is formed on the lower gap layer 12. The magnetoresistive element 13 has an anisotropic magnetoresistive (AMR) structure or a giant magnetoresistive (GMR) structure exhibiting a giant magnetoresistive effect, such as a spin-valve film. An upper gap layer 14 formed of alumina or the like is formed on the magnetoresistive element 13.

A lower core layer 15 is formed on the upper gap layer 14. The lower core layer 15 is formed of a soft magnetic material. In the combined thin-film magnetic head shown in FIG. 1, the lower core layer 15 functions not only as a core layer of the inductive head h2 but also as an upper shielding layer of the MR head h1.

A gap layer 18 composed of a nonmagnetic material such as alumina or $SiO_2$ is formed on the lower core layer 15. An insulating layer 19 composed of a polyimide or resist material is formed on the gap layer 18 and a coil layer 20 having a planar spiral pattern is formed thereon. The coil layer 20 is formed of a nonmagnetic conductive material having low electrical resistance, such as copper.

The coil layer 20 is covered with an insulating layer 21 formed of a polyimide or resist material and an upper core layer 42 is formed on the insulating layer 21. The upper core layer 42 is composed of magnetic materials. A leading edge 42a faces the lower core layer 15 separated by the gap layer 18, and a base portion 42b of the core layer 42 is magnetically coupled with the lower core layer 15.

In this embodiment, the upper core layer 42 is composed of a soft magnetic layer 22 and a high-specific-resistance layer 40 formed thereon. The specific resistance ρ of the high-specific-resistance layer 40 is higher than the specific resistance ρ of the soft magnetic layer 22. The high-specific-resistance layer 40 on the soft magnetic layer 22 decreases eddy current loss which is generated as recording frequencies are increased. As a result, the OW characteristic and NLTS characteristic are improved to levels which are suitable for future high recording frequencies.

The thickness h3 of the high-specific-resistance layer 40 is preferably 1 μm or less. The maximum thickness of the high-specific-resistance layer 40 is preferably equal to or less than the-thickness of the upper core layer 42. The total thickness of the high-specific-resistance layer 40 and the soft magnetic layer 22 is preferably in a range of 1.5 μm to 5.0 μm. The high-specific-resistance layer 40 having a thickness of 1 pm at most can effectively reduce eddy current loss. When the total thickness of the high-specific-resistance layer 40 and the soft magnetic layer 22 is controlled to be within the above range and when the thickness of the high-specific-resistance layer 40 is equal to or less than half of the total thickness, a recording magnetic field can be concentrated in the vicinity of the gap, resulting in high recording density, in addition to effectively reduced eddy current loss. The specific resistance ρ of the high-specific-resistance layer 40 is preferably 60 μΩ·cm or more.

The high-specific-resistance layer 40 is covered with a protective layer 41 to prevent the formation of cracks in the high-specific-resistance layer 40 since the high-specific-resistance layer 40 is mechanically and thermally fragile. The protective layer 41 is preferably composed of a NiFe alloy, metallic Ni, or NiP.

It is preferable that the saturation magnetic flux density $B_s$ of the soft magnetic layer 22 be higher than the saturation magnetic flux density $B_s$ of the high-specific-resistance layer 40. In this relationship, the coil layer 20 can induce a recording magnetic field at the opposing face (ABS) to a recording medium between the upper core layer 42 and the lower core layer 15 having high saturation magnetic flux densities $B_s$.

Since the upper core layer 42 and the lower core layer 15 are separated by the gap layer 18, the recording magnetic field generated between the upper core layer 42 and the lower core layer 15 is concentrated in the vicinity of the gap. Thus, recording resolution is improved to an extent which is suitable for future high-density recording.

In this embodiment, the lower core layer 15 is composed of a single film. As described above, the lower core layer 15 primarily functions as a shield for the MR head h1. Deterioration of the shielding function of the lower core layer 15 is undesirable. When the lower core layer 15 is formed of, for example, a magnetic material having a high specific resistance ρ, the shielding function may be decreased. The shielding function is necessary to reduce noise in the recorded signals which are produced in the magnetoresistive element 13. An improved shielding function requires a high permeability μ and a low magnetostriction constant λ. Thus, most preferable characteristics for the lower core layer 15 are a high permeability μ and a low magnetostriction constant λ, in addition to a high specific resistance ρ.

Soft magnetic materials used in the lower core layer 15 and/or the upper core layer 42 in the present invention will now be described.

(1) When the soft magnetic layer 22 and the high-specific-resistance layer 40 are formed of soft magnetic materials which contain the same elements including iron (Fe), the Fe content in the soft magnetic layer 22 is preferably higher than the Fe content in the high-specific-resistance layer 40. In this case, the saturation magnetic flux density $B_s$ of the soft magnetic layer 22 is higher than the saturation magnetic flux density $B_s$ of the high-specific-resistance layer 40.

When the lower core layer 15 is composed of a soft magnetic layer and a high-specific-resistance layer provided on and/or under the soft magnetic layer, it is preferable that the Fe content in the soft magnetic layer be higher than the Fe content in the high-specific-resistance layer.

(2) At least one of the soft magnetic layer of the upper core layer 42, the soft magnetic layer of the lower core layer 15, and the high-specific-resistance layer 40 preferably has a composition represented by $Co_xFe_y$, and satisfies the relationships $20 \leq x \leq 40$ and $60 \leq y \leq 80$, or $86 \leq x \leq 92$, $8 \leq y \leq 14$, and x+y=100, wherein x and y represent Co and Fe contents, respectively, by atomic percent.

This soft magnetic material has a higher saturation magnetic flux density $B_s$ and a higher specific resistance ρ compared to NiFeNb alloys. Thus, this soft magnetic material may be used in soft magnetic layers constituting the upper core layer 42 and/or the lower core layer 15 which require high saturation magnetic flux densities $B_s$. Alternatively, this soft magnetic material may be used in the high-specific-resistance layer 40 which requires a high specific resistance ρ in order to achieve high recording frequencies. In the present invention, this soft magnetic material is more preferably used in the upper core layer 42 and/or the lower core layer 15 which require high saturation magnetic flux densities $B_s$.

(3) At least one of the soft magnetic layer of the upper core layer 42, the soft magnetic layer of the lower core layer 15, and the high-specific-resistance layer 40 preferably has a composition represented by $Co_xFe_yNi_z$ and satisfies the relationships $0.1 \leq x \leq 15$, $38 \leq y \leq 60$, $40 \leq z \leq 62$, and x+y+z 100, wherein x, y, and z represent Co, Fe, and Ni contents, respectively, by percent by weight.

This soft magnetic material has a higher saturation magnetic flux density $B_s$ and a higher specific resistance ρ compared to NiFeNb alloys and CoFe alloys. Thus, this soft magnetic material may be used in soft magnetic layers constituting the upper core layer 42 and/or the lower core layer 15 which require high saturation magnetic flux densities $B_s$. Alternatively, this soft magnetic material may be used in the high-specific-resistance layer 40 which requires a high specific resistance ρ in order to achieve high recording frequencies. In the present invention, this soft magnetic material is more preferably used in the upper core layer 42 and/or the lower core layer 15 which require high saturation magnetic flux densities $B_s$.

(4) At least one of the soft magnetic layer of the upper core layer 42, the soft magnetic layer of the lowers core layer 15, and the high-specific-resistance layer 40 preferably has a composition represented by $Co_xFe_yNi_zX_w$, and satisfies the relationships $0.1 \leq x \leq 15$, $38 \leq y \leq 60$, $40 \leq z \leq 62$, $0.1 \leq w \leq 3$, and x+y+z+w=100, wherein x, y, z, and w represent Co, Fe, Ni, and X contents, respectively, by percent by weight, and X is at least one element selected from the group consisting of Mo, Cr, Pd, B, and In.

This soft magnetic material has a higher specific resistance ρ compared to CoNi alloys and has a higher saturation magnetic flux density $B_s$ compared to CoNiFe alloys. Thus, this soft magnetic material may be used in soft magnetic layers constituting the upper core layer 42 and/or the lower core layer 15 which require high saturation magnetic flux densities $B_s$. Alternatively, this soft magnetic material may be used in the high-specific-resistance layer 40 which requires a high specific resistance ρ in order to achieve high recording frequencies. In the present invention, this soft magnetic material is more preferably used in the upper core layer 42 and/or the lower core layer 15 which require high saturation magnetic flux densities $B_s$.

(5) At least one of the soft magnetic layer of the upper core layer 42, the soft magnetic layer of the lower core layer 15, and the high-specific-resistance layer 40 preferably has a composition represented by $Ni_xFe_y$ and satisfies the relationships $10 \leq x \leq 70$, $30 \leq y \leq 90$, and x+y=100, wherein x and y represent Ni and Fe contents, respectively, by atomic percent.

This soft magnetic material has a saturation magnetic flux density $B_s$ of approximately 1.3 T and a specific resistance ρ of approximately 50 μΩ·cm which are higher than those of a $Ni_{80}Fe_{20}$ alloy ($B_s$ is approximately 0.95 T and ρ is approximately 20 μΩ·cm). Thus, this soft magnetic material may be used in soft magnetic layers constituting the upper core layer 42 and/or the lower core layer 15 which require high saturation magnetic flux densities $B_s$. More preferably in the present invention, this soft magnetic material is used in the high-specific-resistance layer 40 which requires a high specific resistance ρ in order to achieve high recording frequencies.

(6) At least one of the soft magnetic layer of the upper core layer 42, the soft magnetic layer of the lower core layer 15, and the high-specific-resistance layer 40 preferably has a composition represented by $Fe_aM_bO_c$ and satisfies the relationships $50 \leq a \leq 70$, $5 \leq b \leq 30$, $10 \leq c \leq 30$, and a+b+c= 100, wherein a, b, and c represent Fe, M, and O contents, respectively, by atomic percent, and M is at least one element selected from the group consisting of Hf, Zr, Ti, V, Nb, Ta, Cr, Mo, and W.

This soft magnetic material has significantly small crystal magnetic anisotropy, and thus has a small coercive force $H_c$ and a superior soft magnetic characteristic. Since this soft magnetic material has a significantly high specific resistance ρ of 400 to $2 \times 10^5$ μΩ·cm, this material is preferably used in the high-specific-resistance layer 40 which requires a high specific resistance ρ.

(7) The soft magnetic layer of the upper core layer 42 and/or the soft magnetic layer of the lower core layer 15 preferably has a composition represented by $Co_xZr_yNb_z$ and satisfies the relationships $1.5 \leq y \leq 13$, $6.5 \leq z \leq 15$, $1 \leq (y/z) \leq 2.5$, and x+y+z=100, wherein x, y, and z represent Co, Zr, and Nb contents, respectively, by atomic percent.

Since this soft magnetic material has a high saturation magnetic flux density $B_s$ and does not show crystal magnetic anisotropy, this soft magnetic material exhibits superior soft magnetic characteristics.

(8) The soft magnetic layer of the upper core layer 42 and/or the soft magnetic layer of the lower core layer 15 preferably has a composition represented by $Co_xHf_yNb_z$ and satisfies the relationships $1.5 \leq y \leq 13$, $6.5 \leq z \leq 15$, $1 \leq (y/z) \leq 2.5$, and x+y+z=100, wherein x, y, and z represent Co, Hf, and Nb contents, respectively, by atomic percent.

Since this soft magnetic material has a high saturation magnetic flux density $B_s$ and does not show crystal magnetic anisotropy, this soft magnetic material exhibits superior soft magnetic characteristics.

(9) The soft magnetic layer of the upper core layer 42 and/or the soft magnetic layer of the lower core layer 15 are preferably formed of the following soft magnetic material. This material is composed of Fe as the major component, cobalt (Co), and at least one element M selected from the group consisting of Hf, Zr, Ti, V, Nb, Ta, Cr, Mo, and W. The composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and x+y+z=100.

By the precipitation of carbides of the element M, the crystal grain size of the Fe-based alloy can be reduced. Thus, this alloy exhibits significantly reduced crystal magnetic anisotropy. Since this alloy has a higher saturation magnetic flux density $B_s$ and a lower coercive force $H_c$ compared to the above CoHfNb alloy, this alloy exhibits superior soft magnetic characteristics suitable for high recording density. Moreover, this alloy is superior to the CoHfNb alloy in thermal resistance due to the precipitated M carbides.

(10) The soft magnetic layer of the upper core layer 42 and/or the soft magnetic layer of the lower core layer 15 are preferably formed of the following soft magnetic material. This material is composed of at least one element T selected from Fe and Co as the major component, at least one element X selected from Si and Al, at least one element M selected from the group consisting of Ti, Zr, Hf, V, Ta, Mo, and W, at least one element Z selected from C and N, and at least one element Q selected from the group consisting of Cr, Re, Rh, Ni, Pd, Pt, and Au. The composition includes a crystalline phase primarily composed of the element T, and a crystalline phase composed of carbide and/or nitride of the element M, and is composed of microcrystallites having an average crystal grain size of not more than 40 nm on the whole, wherein the ratio of the average crystal grain size d of the M carbide and/or M nitride to the average crystal grain size D of the Fe and/or Co crystalline phase is in a range of $0.05 \leq d/D \leq 0.4$, and the composition is represented by the formula $T_a X_b M_c Z_d Q_e$, wherein a, b, c, d, and e represent atomic percent and satisfy the relationships $0 \leq b \leq 25$, $1 \leq c \leq 10$, $5 \leq d \leq 15$, $0 \leq e \leq 10$, and a+b+c+d+e=100.

Since this alloy contains the element X, this alloy exhibits a specific resistance $\rho$ of approximately 120 $\mu\Omega \cdot$cm, and corrosion resistance and oxidation resistance which are greater than those of the above FeMnC alloy.

(11) The soft magnetic layer of the upper core layer 42 and/or the soft magnetic layer of the lower core layer 15 are preferably formed of the following soft magnetic material. This material is composed of at least one element T selected from Fe and Co as the major component, Si, Al, at least one element M selected from the group consisting of Zr, Hf, Nb, and Ta, at least one element Z selected from C and N, and at least one element Q selected from the group consisting of Cr, Ti, Mo, W, V, Re, Ru, Rh, Ni, Pd, Pt, and Au. The composition includes a body centered cubic microcrystalline phase primarily composed of the element T and having an average crystal grain size of not more than 40 nm, wherein at least Si or Al and the element Q are dissolved therein, and a crystalline phase of M carbide and/or M nitride which is precipitated at the grain boundaries of the microcrystalline phase, wherein the composition is represented by the formula $T_a Si_b Al_c M_d Z_e Q_f$, wherein a, b, c, d, e, and f represent atomic percent and satisfy the relationships $8 \leq b \leq 15$, $0 \leq c \leq 10$, $1 \leq d \leq 10$, $1 \leq e \leq 10$, $0 \leq f \leq 15$, and a+b+c+d+e+f=100.

Since this material contains both Si and Al, this alloy has a magnetostriction in which the absolute value thereof is smaller than that of the above T-X-M-Z-Q alloy. Thus, this material has reduced internal stress and is resistant to environmental influences such as temperature.

(12) The soft magnetic layer of the upper core layer 42 and/or the soft magnetic layer of the lower core layer 15 preferably has a composition which is represented by the formula $Ni_{1-x}Fe_x$, and has an average crystal grain size of not more than 105 Å, wherein the Fe content is in a range of 60 to 90 percent by weight. It is preferable that the centerline average roughness ($R_a$) of the surface of the soft magnetic film be not more than 25 Å. This material has a high saturation magnetic flux density $B_s$ of 1.9 T (tesla) at most and a low coercive force $H_c$ of 1.5 Oe (oersted) or less.

(13) The high-specific-resistance layer 40 preferably formed of a soft magnetic material which contains at least Ni, Fe, and N as constituents has an average crystal grain size of not more than 80 Å, and an Fe content of at least 30 percent. Moreover, it is preferable that the center-line average roughness ($R_a$) of the surface of the soft magnetic film be not more than 120 Å. This material contains nitrogen (N) as a nonmetallic element, and this soft magnetic material exhibits a specific resistance $\rho$ which is higher than that of the NiFe alloy, and a coercive force $H_c$ and a saturation magnetic flux density $B_s$ which are substantially equal to those of the NiFe alloy.

(14) The high-specific-resistance layer 40 is preferably composed of a soft magnetic material having a composition represented by the formula $Ni_x Fe_y Nb_z$, wherein x, y, and z indicate atomic percent and satisfy the relationships $76 \leq x \leq 84$, $8 \leq y \leq 15$, $5 \leq z \leq 12$, and x+y+z=100. This soft magnetic material exhibits a specific resistance $\rho$ which is higher than that of the NiFe alloy.

(15) The high-specific-resistance layer 40 is preferably formed of an FeNiP alloy or an FeNiPN alloy. This soft magnetic material also exhibits a specific resistance $\rho$ which is higher than that of the NiFe alloy.

When the soft magnetic layers constituting the upper core layer 42 and/or the lower core layer 15 are formed of the above NiFe alloy (12), the soft magnetic layers may be formed by an electroplating process using a pulsed current in the present invention. In the NiFe alloy electroplated using the pulsed current, the saturation magnetic flux density $B_s$ can be increased to approximately 1.9 T at most as the Fe content (by weight) increases in the plating film.

It is preferable that the electroplated NiFe alloy have an average crystal grain size of 105 Å and the Fe content be in a range of 60 to 90 percent by weight. Moreover, the center-line average roughness ($R_a$) of the surface of the soft magnetic film is preferably not more than 25 Å.

The NiFe alloy formed by the electroplating using the pulsed current is composed of a microcrystalline phase. As a result, the saturation magnetic flux density $B_s$ is improved and the coercive force $H_c$ is reduced to 1.5 Oe or less.

When the high-specific-resistance layer 40 is composed of the soft magnetic material (13), the high-specific-resistance layer 40 may be formed by the following process. The soft magnetic material containing at least Fe, Ni, and N can be formed by adding an amino-based organic material to a plating bath containing Fe and Ni ions.

This soft magnetic material containing nitrogen (N) as a nonmetallic element exhibits a high specific resistance $\rho$ of at least 50 $\mu\Omega \cdot$cm.

In the present invention, the pH value of the plating bath is optimized so that the center-line average roughness ($R_a$) of the surface of the soft magnetic layer is minimized. Thus, the coercive force $H_c$ can be suppressed to a proper level. The pH value is preferably maintained at 1.8 or less.

The amino-based organic material added to the plating bath may contain at least one material selected from the group consisting of ethylenediamine (EDA), diethylenetriamine (DETA), triethylenetetramine (TETA), alanine (Ala), and glutamic acid (Glu).

In the embodiment shown in FIG. 1, each of the soft magnetic layer 22 of the upper core layer 42 and the lower core layer 15 is composed of a single layer. These layers may have a multi-layer configuration in the present invention. In the multi-layer configuration, it is preferable that the specific resistance $\rho$ be preferably improved as the layer becomes distant from the magnetic gap, or that the saturation magnetic flux density $B_s$ be improved as the layer approaches the magnetic gap.

Figure 2:
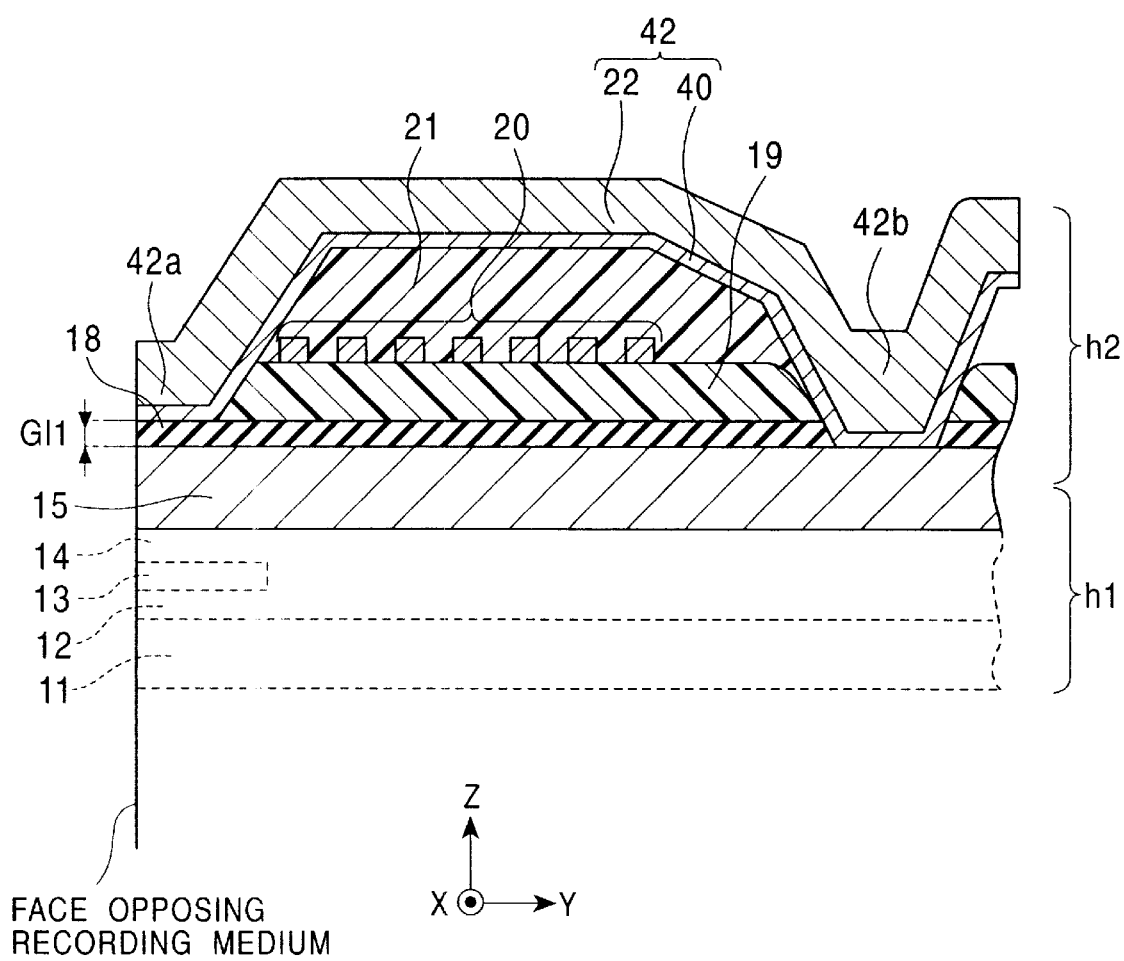
FIG. 2 is an enlarged cross-sectional view of a thin-film magnetic head according to a second embodiment of the present invention.

FIG. 2 is a partial longitudinal cross-sectional view of a second embodiment of the thin-film magnetic head in accordance with the present invention.

In this embodiment, the structure of the upper core layer 42 is different from that in FIG. 1, and the other portions are the same as those in FIG. 1. An upper core layer 42 is formed of a high-specific-resistance layer 40 and a soft magnetic layer 22 provided thereunder. The specific resistance ρ of the high-specific-resistance layer 40 is higher than the specific resistance ρ of the soft magnetic layer 22. The high-specific-resistance layer 40 under the soft magnetic layer 22 decreases eddy current loss which is generated as recording frequencies are increased. As a result, the OW characteristic and NLTS characteristic are improved to levels which are suitable for future high recording frequencies. The preferable parameters, such as the thickness, of the high-specific-resistance layer 40 are the same as those in the embodiment shown in FIG. 1.

It is preferable in this embodiment that the saturation magnetic flux density $B_s$ of the soft magnetic layer 22 be higher than the saturation magnetic flux density $B_s$ of the high-specific-resistance layer 40 in order to concentrate the recording magnetic field in the vicinity of the gap and to improve recording characteristics.

In this embodiment, the high-specific-resistance layer 40 extends to a portion (a magnetic path-forming region) in contact with a gap layer 18. However, it is preferable that the high-specific-resistance layer 40 not be formed in the magnetic path-forming region in order to concentrate the recording magnetic field in the vicinity of the gap.

The soft magnetic layer of the upper core layer 42 and/or the soft magnetic layer of the lower core layer 15, and the high-specific-resistance layer 40 are preferably formed of the above materials (1) to (15).

Figure 3:
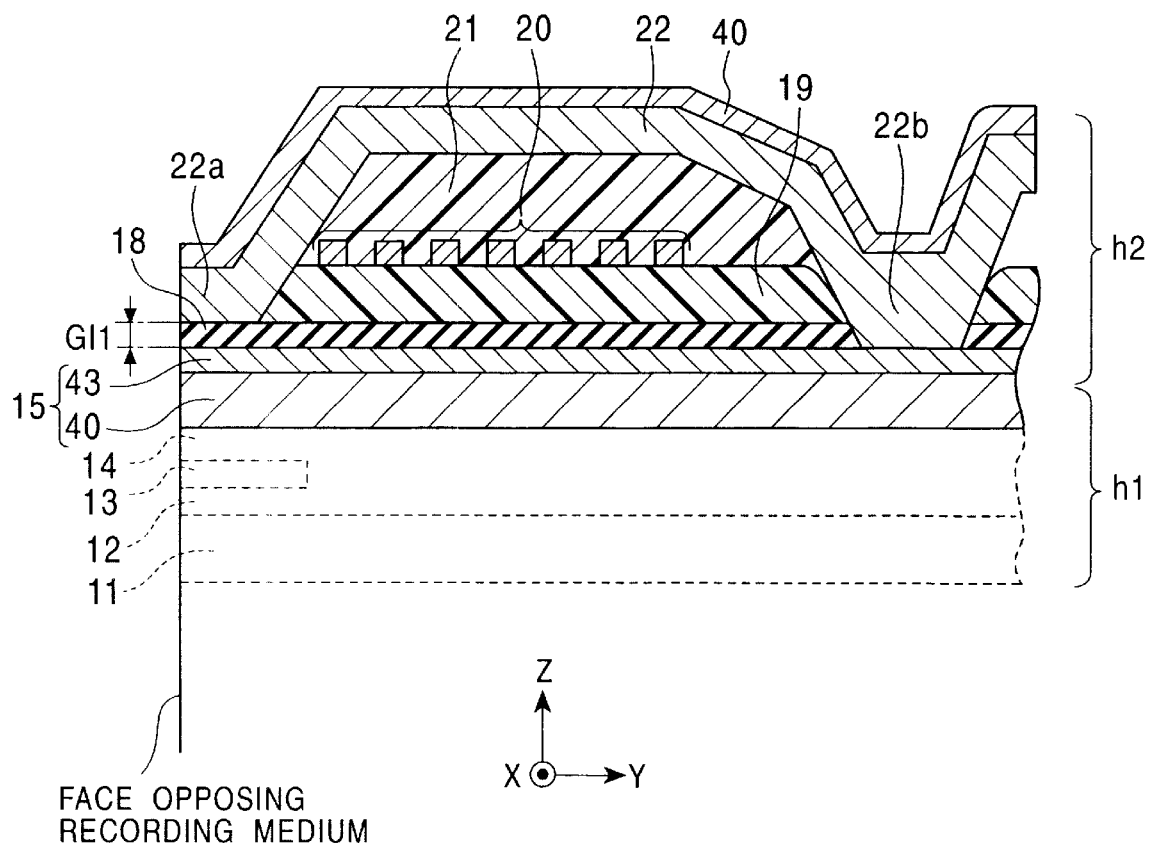
FIG. 3 is an enlarged cross-sectional view of a thin-film magnetic head according to a third embodiment of the present invention.

FIG. 3 is a partial longitudinal cross-sectional view of a third embodiment in which the lower core layer 15 also includes another high-specific-resistance layer 40 provided under a soft magnetic layer 43 of the lower core layer 15. The high-specific-resistance layer 40 under the soft magnetic layer 43 decreases eddy current loss which is generated as recording frequencies are increased. As a result, the OW characteristic and NLTS characteristic are improved to levels which are suitable for future high recording frequencies. The preferable parameters, such as the thickness, of the high-specific-resistance layer 40 are the same as those in the embodiment shown in FIG. 1.

It is preferable in this embodiment that the saturation magnetic flux density $B_s$ of the soft magnetic layer 43 be higher than the saturation magnetic flux density $B_s$ of the high-specific-resistance layer 40 in order to concentrate the recording magnetic field in the vicinity of the gap and to improve recording characteristics.

The high-specific-resistance layer 40 may be provided on the soft magnetic layer 43. However, it is preferable that the high-specific-resistance layer 40 do not be formed in a portion (magnetic path-forming region) in contact with the upper core layer 42 with the gap layer 18 in order to concentrate the recording magnetic field in the vicinity of the gap.

Since the high-specific-resistance layer 40 formed under the soft magnetic layer 43 primarily functions as a shield for the MR head h1, the deterioration of the shielding function of this layer in order to improve the specific resistance ρ of the high-specific-resistance layer 40 is undesirable. The shielding function is necessary to reduce noise in the recorded signals which are produced in the magnetoresistive element 13. An improved shielding function requires a high permeability μ and a low magnetostriction constant λ. The most important soft magnetic characteristics for the high-specific-resistance layer 40 are high permeability and a low magnetostriction constant rather than a higher specific resistance ρ. Thus, it is preferable that the specific resistance ρ be improved under the conditions that these soft magnetic characteristics are also improved.

Figure 4:
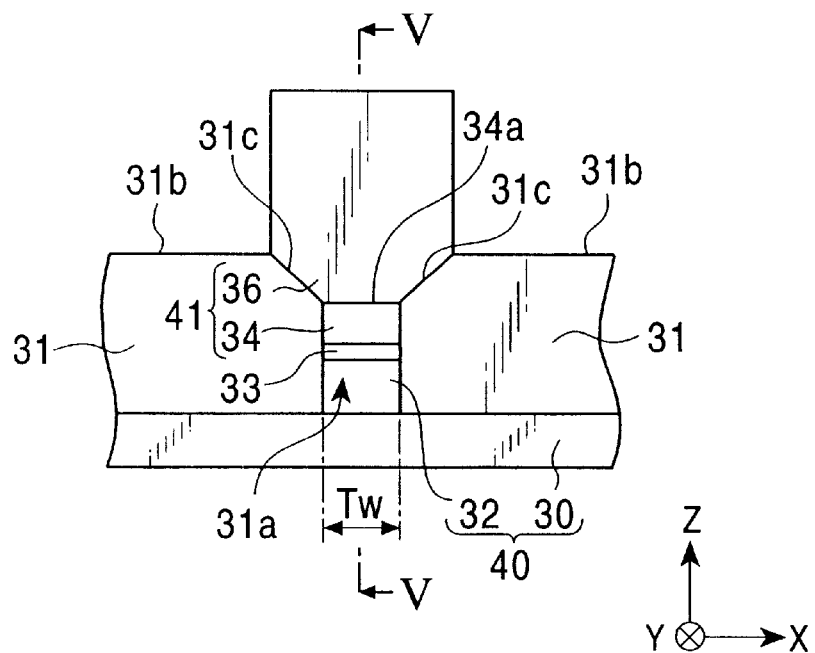
FIG. 4 is partial front view of a thin-film magnetic head according to a fourth embodiment of the present invention.
Figure 5:
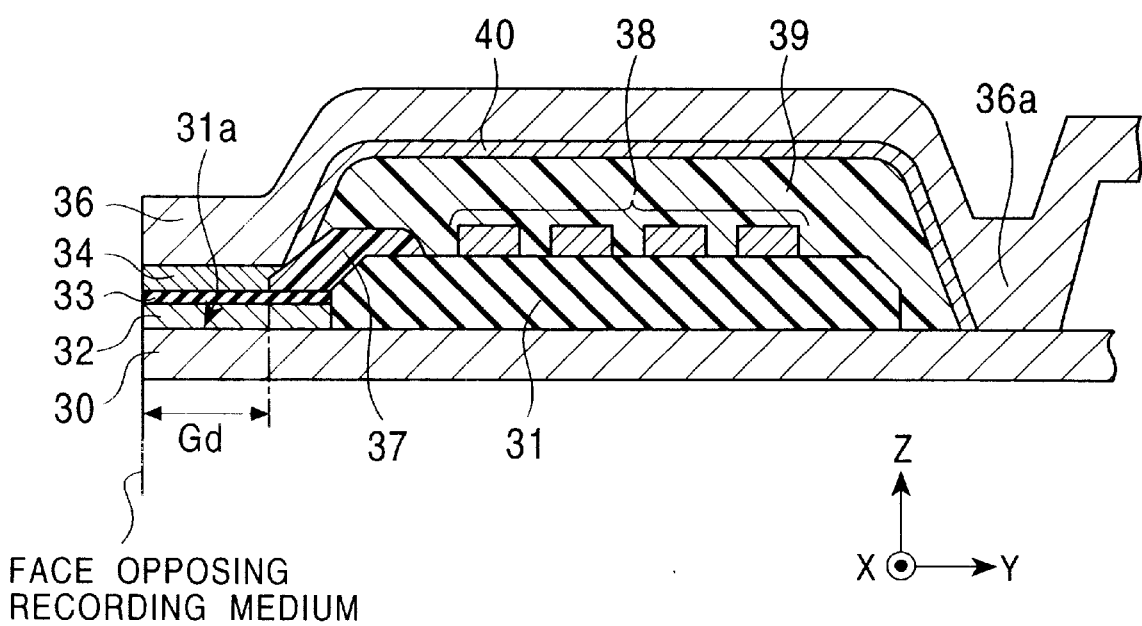
FIG. 5 is a partial cross-sectional view of the thin-film magnetic head taken along line V—V in FIG. 4.

FIG. 4 is a partial front view of a fourth embodiment of the thin-film magnetic head in accordance with the present invention, and FIG. 5 is a partial cross-sectional view of the thin-film magnetic head taken along line V—V in FIG. 4 and viewed from the direction of the arrows shown in FIG. 4.

This thin-film magnetic head shown in FIGS. 4 and 5 is an inductive head for writing. For example, this inductive write head is deposited on a read head (MR head hi in FIG. 1) exhibiting magnetoresistive effects.

This thin-film magnetic head has a soft magnetic layer (lower core layer) 30 which is formed of a soft magnetic material. An insulating layer 31 composed of an insulating material is formed on the soft magnetic layer 30. The insulating material is composed of at least one of AlO, $Al_2O_3$, $SiO_2$, $Ta_2O_5$, TiO, AlN, AlSiN, TiN, SiN, $Si_3N_4$, NiO, WO, $WO_3$, BN, and CrN. The insulating layer 31 may have a single-layer configuration or a multi-layer configuration.

In the present invention, a groove 31a having a predetermined length extends from a face (ABS) opposing a recording medium to the height direction (Y direction in the drawings) in the insulating layer 31. The insulating layer 31 is formed by, for example, a reactive ion etching (RIE) process, and the groove 31a in the insulating layer 31 has at least a width which defines the track width Tw. The track width Tw is preferably 1.0 μm or less and more preferably 0.7 μm or less.

A lower magnetic pole section 32 is formed as a bottommost layer in the groove 31a and is magnetically coupled with the soft magnetic layer 30. A gap layer 33 is formed on the lower magnetic pole section 32 in the groove 31a. The gap layer 33 is formed of at least one nonmagnetic material selected from the group consisting of NiP, NiPd, NiPt, NiRh, NiW, NiMo, Au, Pt, Rh, Pd, Ru, and Cr. Moreover, an upper magnetic pole section 34 is formed on the gap layer 33 in the groove 31a.

The insulating layer 31 has diverging sloping faces 31c which extend from the edges of a surface 34a of the upper magnetic pole section 34 to a surface 31b of the insulating layer 31. A soft magnetic layer 36 constituting an upper core layer is formed over the upper magnetic pole section 34 and the sloping faces 31c.

As shown in FIG. 5, a predetermined gap Gd extends from the face opposing the recording medium toward the height direction (Y direction in the drawing) on the gap layer 33, and the insulating layer 37 extends from the back end of the gap Gd over the gap layer 33 and the insulating layer 31 at the height side. Thus, the insulating layer 37 defines the gap Gd. The gap Gd is formed of an organic resin material, such as a polyimide or a resist material.

A coil layer 38 having a spiral pattern is formed on the insulating layer 31 behind the groove 31a. In FIG. 5, the coil layer 38 is directly formed on the insulating layer 31. In another preferred embodiment, the insulating layer 37 may extend over the insulating layer 31 and the coil layer 38 may be formed on the insulating layer 37. A coil insulating layer 39 covers the coil layer 38. The coil insulating layer 39 is formed of an organic resin material, such as a polyimide or a resist material.

The soft magnetic layer 36 extends in the height direction from the face opposing the recording medium, and a base 36a of the soft magnetic layer 36 is magnetically coupled with the lower core layer 30.

In this embodiment, a high-specific-resistance layer 40 is formed under the soft magnetic layer 36. The specific resistance ρ of the high-specific-resistance layer 40 is higher than the specific resistance ρ of the soft magnetic layer 36. The high-specific-resistance layer 40 is not provided at a leading portion (magnetic path-forming region) and thus is not exposed at the opposing face. As a result, the high-specific-resistance layer 40 does not.inhibit concentration of the recording magnetic field in the vicinity of the gap, and the thin-film magnetic head is suitable for high recording density.

As described above, the lower magnetic pole section 32 and the upper magnetic pole section 34 are magnetically coupled with the soft magnetic layer 30 and the soft magnetic layer 36, respectively, in the vicinity of the gap. The lower magnetic pole section 32 and the upper magnetic pole section 34 have saturation magnetic flux densities $B_s$ which are higher than the saturation magnetic flux densities $B_s$ of the soft magnetic layer 30 and the soft magnetic layer 36, respectively. Accordingly, the lower magnetic pole section 32 and the upper magnetic pole section 34 are high $B_s$ layers. These high $B_s$ layers can concentrate the recording magnetic field in the vicinity of the gap and are advantageous for trends toward high recording density.

In this embodiment, the lower magnetic pole section 32 and the upper magnetic pole section 34 are formed in the groove 31a of the insulating layer 31, and the width in the track width direction (X direction) of the groove 31a is significantly narrow. Thus, this thin-film magnetic head is suitable for high-density recording on narrower tracks.

The upper magnetic pole section 34 and the soft magnetic layer 36 (high $B_s$ layers) are preferably formed of the above soft magnetic materials (1) to (12).

In this embodiment shown in FIGS. 4 and 5, the lower magnetic pole section 32 and the upper magnetic pole section 34 are formed only in the groove 31a of the insulating layer 31. The lower magnetic pole section 32 may extend under the insulating layer 31 below the coil layer 38 from the groove 31a. Moreover, the upper magnetic pole section 34 may extend over the coil insulating layer 39 from the groove 31a. In addition, the soft magnetic layer 30 may protrude in the groove 31a.

As described above, in the thin-film magnetic head, at least one core layer of the upper core layer and the lower core layer includes a soft magnetic layer and a high-specific-resistance layer formed on and/or under the soft magnetic layer and having a specific resistance ρ which is higher than that of the soft magnetic layer. This high-specific-resistance layer can reduce eddy current loss which is generated as recording frequencies increase. Thus, the resulting thin-film magnetic head is suitable for future high recording frequencies.

The soft magnetic layer preferably has a saturation magnetic flux density $B_s$ which is higher than that of the high-specific-resistance layer. Such a soft magnetic layer facilitates generation of a high recording magnetic field in the vicinity of the gap of each core layer and contributes to improved recording resolution. Thus, the thin-film magnetic head is suitable for future trends toward high-density recording.

The high-specific-resistance layer 40 is formed on the soft magnetic layer 22 of the upper core layer 42 in FIG. 1, under the soft magnetic layer 22 of the upper core layer 42 in FIG. 2, or under the soft magnetic layer 36 of the upper core layer in FIG. 5. Alternatively, two high-specific-resistance layers 40 are formed on the soft magnetic layer 22 of the upper core layer 42 and under the soft magnetic layer 43 of the lower core layer 15 in FIG. 3. Instead, four high-specific-resistance layers 40 may be formed on and under the soft magnetic layer of the upper core layer and on and under the soft magnetic layer of the lower core layer. Accordingly, the number and the positions of the high-specific-resistance layers 40 can be determined without restriction.

EXAMPLES

A thin-film magnetic head in accordance with the present invention and a thin-film magnetic head for comparison were produced and the OW characteristic, the PW50 characteristic, and the NLTS characteristic of each thin-film magnetic head were measured.

In the thin-film magnetic head in accordance with the present invention (referred to as EXAMPLE in the drawings), a high-specific-resistance layer was formed on a soft magnetic layer constituting an upper core layer, and another high-specific-resistance layer was formed under a soft magnetic layer constituting a lower core layer. That is, these soft magnetic layers were formed at sides opposing the gap layer. The soft magnetic layers and the high-specific-resistance layers were formed of NiFe alloys, and the Fe content in each soft magnetic layer was higher than the Fe content in the corresponding high-specific-resistance layer. Thus, the saturation magnetic flux density $B_s$ of each soft magnetic layer was higher than the saturation magnetic flux density $B_s$ of the corresponding high-specific-resistance layer.

The saturation magnetic flux density $B_s$ of each soft magnetic layer was approximately 1.6 T and the saturation magnetic flux density $B_s$ of each high-specific-resistance layer was approximately 1.0 T.

In the thin-film magnetic head for comparison (referred to as COMPARATIVE EXAMPLE in the drawings), an upper core layer included two soft magnetic layers and a lower core layer had a single-layer configuration. All the soft magnetic layers were formed of NiFe alloys. The Fe content in the soft magnetic layer formed at the side opposing the gap layer of the upper core layer was higher than the Fe content in the other soft magnetic layer. Thus, the saturation magnetic flux density $B_s$ of the soft magnetic layer (NiFe alloy) at the side opposing the gap layer was higher than the saturation magnetic flux density $B_s$ of the other soft magnetic layer (NiFe alloy).

The saturation magnetic flux density $B_s$ of the NiFe alloy at the side opposing the gap layer was approximately 1.6 T and the saturation magnetic flux density $B_s$ of the other NiFe alloy was approximately 1.0 T. The saturation magnetic flux density $B_s$ of the lower core layer (single layer) was in a range of approximately 1.4 T to 1.6 T.

Figure 6:
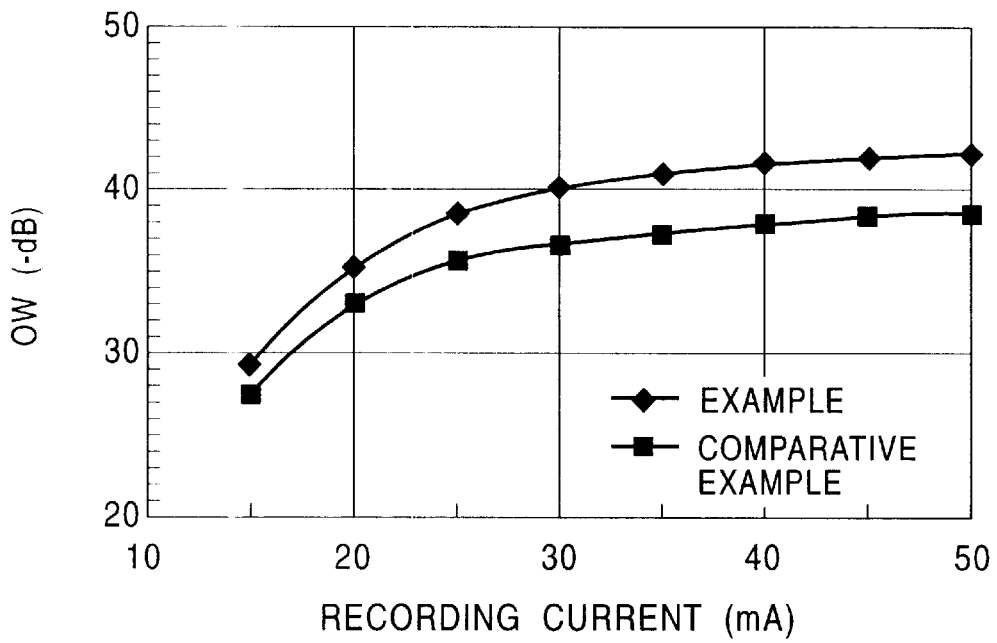
FIG. 6 is a graph showing the relationship between the recording current and the OW characteristic of a thin-film magnetic head of the present invention and a thin-film magnetic head for comparison.

FIG. 6 is a graph of the relationship between the recording current and the OW characteristic. In the measurement of the OW characteristic, low-frequency signals are written onto a recording medium and then high-frequency signals are overwritten thereon. The OW characteristic is evaluated by the difference in dB between the residual output of the written low-frequency signals after overwriting and the initial output of the written low-frequency signals before the overwriting. An OW characteristic having a larger absolute value is preferable.

As shown in FIG. 6, the absolute value of the OW characteristic increases as the recording current increases in both thin-film magnetic heads of the EXAMPLE and the COMPARATIVE EXAMPLE. However, the absolute value of the OW characteristic of the thin-film magnetic head of the present invention is approximately 5 to 6 dB higher than that of the thin-film magnetic head for comparison. Accordingly, the thin-film magnetic head of the present invention exhibits an improved OW characteristic compared to the thin-film magnetic head for comparison.

Figure 7:
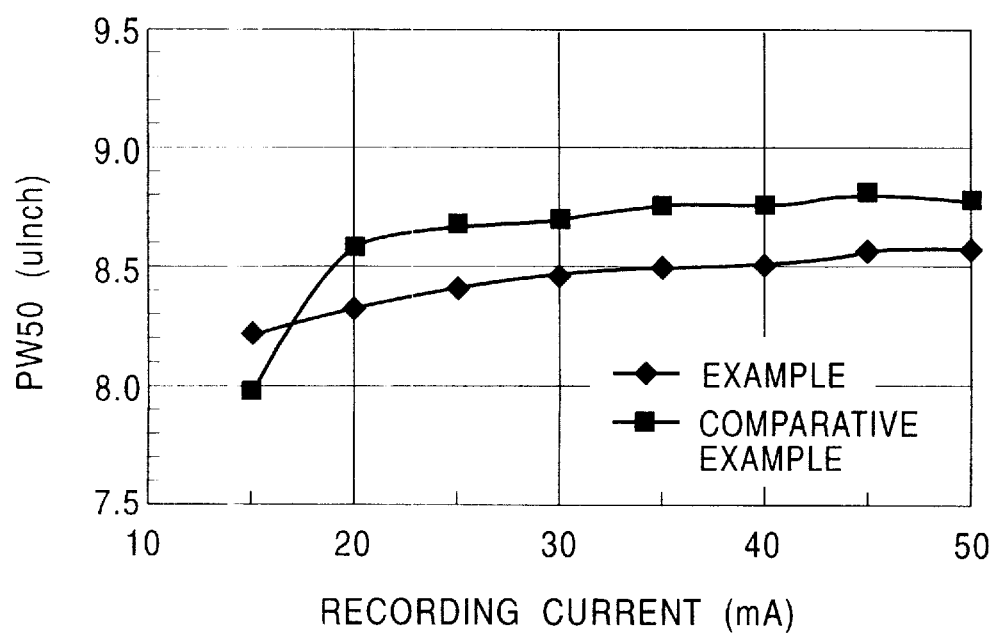
FIG. 7 is a graph showing the relationship between the recording current and the PW50 characteristic of a thin-film magnetic head of the present invention and a thin-film magnetic head for comparison.

FIG. 7 is a graph of the relationship between the recording current and the PW50 characteristic. In the measurement of the PW50 characteristic, a half width of an isolated read waveform is determined. A smaller half width indicates higher recording resolution. As shown in FIG. 7, the half width of the thin-film magnetic head of the present invention is smaller than that of the thin-film magnetic head for comparison. Accordingly, the thin-film magnetic head of the present invention exhibits an improved PW50 characteristic.

Figure 8:
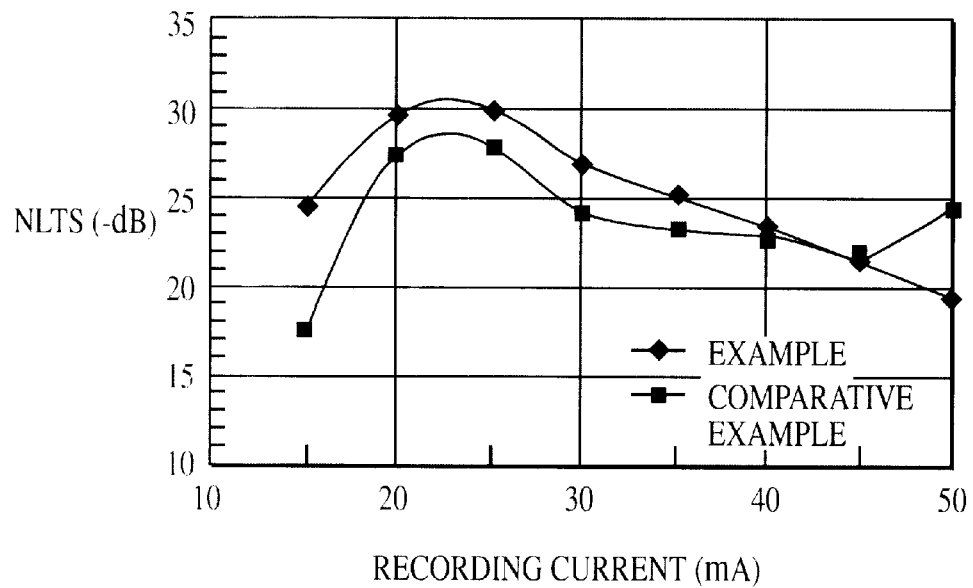
FIG. 8 is a graph showing the relationship between the recording current and the NLTS characteristic of a thin-film magnetic head of the present invention and a thin-film magnetic head for comparison.
Figure 9:
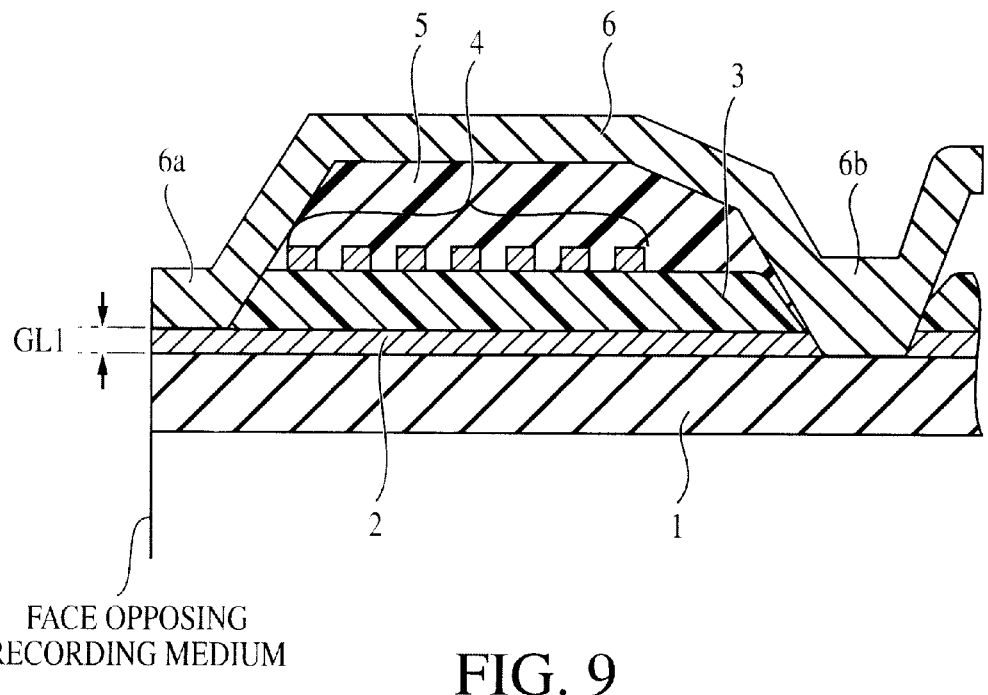
FIG. 9 is a partial cross-sectional view of a conventional thin-film magnetic head according to the prior art.

FIG. 8 is a graph of the relationship between the recording current and the NLTS characteristic. The NLTS characteristic is determined by a fifth harmonic wave method which was developed by IBM Corporation. A larger absolute value of the NLTS characteristic is preferable. As shown in FIG. 8, the thin-film magnetic head of the present invention is superior to that of the thin-film magnetic head for comparison in the NLTS characteristic.

Accordingly, the thin-film magnetic head of the present invention exhibits superior OW, PW50, and NLTS characteristics compared to the thin-film magnetic head for comparison.

What is claimed is:

1. A thin-film magnetic head comprising:
   a gap layer,
   a magnetic pole layer optionally provided on one face of the gap layer;
   a lower core layer;
   an upper core layer, the lower core layer and the upper core layer facing each other and being separated by the gap layer; and
   a coil layer for applying a recording magnetic field to the lower core layer and the upper core layer;
   wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
   wherein the soft magnetic layer has a saturation magnetic flux density $B_s$ which is higher than the saturation magnetic flux density $B_s$ of the high-specific-resistance layer; and
   wherein the soft magnetic layer and the high-specific-resistance layer comprise magnetic materials containing the same components including Fe in at least one of the upper core layer and the lower core layer, and the Fe content in the soft magnetic layer is higher than the Fe content in the high-specific-resistance layer.

2. A thin-film magnetic head according to claim 1, wherein the high-specific-resistance layer is formed on the upper face of the upper core layer and is covered with a protective film.

3. A thin-film magnetic head according to claim 2, wherein the protective film comprises one of a NiFe alloy, elemental Ni, and a NiP alloy.

4. A thin-film magnetic head according to claim 1, wherein the high-specific-resistance layer is formed at a portion other than a magnetic path-forming region toward the gap layer on at least one of the lower face of the upper core layer and the upper face of the lower core layer.

5. A thin-film magnetic head according to claim 1, wherein at least one of the soft magnetic layer and, the high-specific-resistance layer comprises a soft magnetic material having a composition which is represented by $Co_xFe_y$ and satisfies one of first and second pairs of relationships, the first pair being $20 \leq x \leq 40$ and $60 \leq y \leq 80$ and the second pair being $86 \leq x \leq 92$ and $8 \leq y \leq 14$, wherein $x+y=100$, wherein x and y represent Co and Fe contents, respectively, by atomic percent.

6. A thin-film magnetic head according to claim 1, wherein at least one of the soft magnetic layer and the high-specific-resistance layer comprises a soft magnetic material having a composition which is represented by $Co_xFe_yNi_z$ and satisfies the relationships $0.1 \leq x \leq 15$, $38 \leq y \leq 60$, $40 \leq z \leq 62$, and $x+y+z=100$, wherein x, y, and z represent Co, Fe, and Ni contents, respectively, by percent by weight.

7. A thin-film magnetic head according to claim 1, wherein at least one of the soft magnetic layer and the high-specific-resistance layer comprises a soft magnetic material having a composition which is represented by $Co_xFe_yNi_zX_w$ and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

8. A thin-film magnetic head according to claim 1, wherein at least one of the soft magnetic layer and the high-specific-resistance layer comprises a soft magnetic material having a composition which is represented by NixFey and satisfies the relationships $10 \leq x \leq 70$, $30 \leq y \leq 90$, and $x+y=100$, wherein x and y represent Ni and Fe contents, respectively, by atomic percent.

9. A thin-film magnetic head according to claim 8, wherein the high-specific-resistance layer comprises the soft magnetic material.

10. A thin-film magnetic head according to claim 9, wherein the centerline average roughness (Ra) of the surface of the soft magnetic material is not more than 120 Å.

11. A thin-film magnetic head according to claim 1, wherein at least one of the soft magnetic layer and the high-specific-resistance layer comprises a soft magnetic material having a composition which is represented by $Fe_aM_bO_c$ and satisfies the relationships $50 \leq a \leq 70$, $5 \leq b \leq 30$, $10 \leq c \leq 30$, and $a+b+c=100$, wherein a, b, and c represent Fe, M, and O contents, respectively, by atomic percent, and M is at least one element selected from the group consisting of Hf, Zr, Ti, V, Nb, Ta, Cr, Mo, and W.

12. A thin-film magnetic head according to claim 1, wherein the high-specific-resistance layer comprises a soft magnetic material comprising Ni, Fe, and N and having an average crystal grain size of not more than 80 Å, the Fe content being at least 30 percent by weight.

13. A thin-film magnetic head according to claim 1, wherein the high-specific-resistance layer comprises a soft magnetic material having a composition which is represented by $Ni_xFe_yNb_z$, wherein x, y, and z indicate atomic percent and satisfy the relationships $76 \leq x \leq 84$, $8 \leq y \leq 15$, $5 \leq z \leq 12$, and $x+y+z=100$.

14. A thin-film magnetic head according to claim 1, wherein the high-specific-resistance layer comprises one of NiFeP and FeNiPN.

15. A thin-film magnetic head according to claim 1, wherein the soft magnetic layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

16. A thin-film magnetic head according to claim 1, wherein the soft magnetic layer comprises a soft magnetic material having a composition which is represented by the formula $Ni_{1-x}Fe_x$ and has an average crystal grain size of not more than 105 Å, wherein the Fe content is in a range of 60 to 90 percent by weight.

17. A thin-film magnetic head according to claim 16, wherein the centerline average roughness (Ra) of the surface of the soft magnetic film is not more than 25 Å.

18. A thin-film magnetic head comprising:
a gap layer,
a magnetic pole layer optionally provided on one face of the gap layer;
a lower core layer;
an upper core layer, the lower core layer and the upper core layer facing each other and being separated by the gap layer; and
a coil layer for applying a recording magnetic field to the lower core layer and the upper core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
wherein the magnetic pole layer is a high $B_s$ layer having a saturation magnetic flux density $B_s$ which is higher than the saturation magnetic flux density $B_s$ of the soft magnetic layer; and
wherein the soft magnetic layer and the high $B_s$ layer comprise magnetic materials containing the same components including Fe, and the Fe content in the high $B_s$ layer is higher than the Fe content in the soft magnetic layer.

19. A thin-film magnetic head according to claim 18, wherein the soft magnetic layer has a saturation magnetic flux density Bs which is higher than the saturation magnetic flux density Bs of the high-specific-resistance layer.

20. A thin-film magnetic head according to claim 19, wherein the soft magnetic layer and the high-specific-resistance layer comprise magnetic materials containing the same components including Fe in at least one of the upper core layer and the lower core layer, and the Fe content in the soft magnetic layer is higher than the Fe content in the high-specific-resistance layer.

21. A thin-film magnetic head according to claim 18, wherein at least one of the soft magnetic layer, the high-specific-resistance layer, and the high $B_s$ layer comprises a soft magnetic material having a composition which is represented by $Co_xFe_y$ and satisfies one of the pair of relationships $20 \leq x \leq 40$ and $60 \leq y \leq 80$ and the pair of relationships $86 \leq x \leq 92$ and $8 \leq y \leq 14$, and $x+y=100$, wherein x and y represent Co and Fe contents, respectively, by atomic percent.

22. A thin-film magnetic head according to claim 21, wherein at least one of the soft magnetic layer and the high $B_s$ layer comprises the soft magnetic material.

23. A thin-film magnetic head according to claim 18, wherein at least one of the soft magnetic layer, the high-specific-resistance layer, and the high $B_s$ layer comprises a soft magnetic material having a composition which is represented by $Co_xFe_yNi_z$ and satisfies the relationships $0.1 \leq x \leq 15$, $38 \leq y \leq 60$, $40 \leq z \leq 62$, and $x+y+z=100$, wherein x, y, and z represent Co, Fe, and Ni contents, respectively, by percent by weight.

24. A thin-film magnetic head according to claim 18, wherein at least one of the soft magnetic layer, the high-specific-resistance layer, and the high $B_s$ layer comprises a soft magnetic material having a composition which is represented by $Co_xFe_yNi_zX_w$ and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

25. A thin-film magnetic head according to claim 18, wherein at least one of the soft magnetic layer, the high-specific-resistance layer, and the high $B_s$ layer comprises a soft magnetic material having a composition which is represented by $Ni_xFe_y$ and satisfies the relationships $10 \leq x \leq 70$, $30 \leq y \leq 90$, and $x+y=100$, wherein x and y represent Ni and Fe contents, respectively, by atomic percent.

26. A thin-film magnetic head according to claim 25, wherein the high-specific-resistance layer comprises the soft magnetic material.

27. A thin-film magnetic head according to claim 26, wherein the centerline average roughness (Ra) of the surface of the soft magnetic material is not more than 120 Å.

28. A thin-film magnetic head according to claim 18, wherein at least one of the soft magnetic layer, the high-specific-resistance layer, and the high $B_s$ layer comprises a soft magnetic material having a composition which is represented by $Fe_aM_bO_c$ and satisfies the relationships $50 \leq a \leq 70$, $5 \leq b \leq 30$, $10 \leq c \leq 30$, and $a+b+c=100$, wherein a, b, and c represent Fe, M, and O contents, respectively, by atomic percent, and M is at least one element selected from the group consisting of Hf, Zr, Ti, V, Nb, Ta, Cr, Mo, and W.

29. A thin-film magnetic head according to claim 18, wherein the high-specific-resistance layer comprises a soft magnetic material comprising Ni, Fe, and N and having an average crystal grain size of not more than 80 Å, the Fe content being at least 30 percent by weight.

30. A thin-film magnetic head according to claim 18, wherein the high-specific-resistance layer comprises a soft magnetic material having a composition which is represented by $Ni_xFe_yNb_z$, wherein x, y, and z indicate atomic percent and satisfy the relationships $76 \leq x \leq 84$, $8 \leq y \leq 15$, $5 \leq z \leq 12$, and $x+y+z=100$.

31. A thin-film magnetic head according to claim 18, wherein the high-specific-resistance layer comprises one of NiFeP and FeNiPN.

32. A thin-film magnetic head according to claim 18, wherein at least one of the soft magnetic layer and the high $B_s$ layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

33. A thin-film magnetic head according to claim 18, wherein at least one of the soft magnetic layer and the high $B_s$ layer comprises a soft magnetic material having a composition which is represented by the formula $Ni_{1-x}Fe_x$ and has an average crystal grain size of not more than 105 Å, wherein the Fe content is in a range of 60 to 90 percent by weight.

34. A thin-film magnetic head according to claim 33, wherein the centerline average roughness ($R_a$) of the surface of the soft magnetic film is not more than 25 Å.

35. A thin-film magnetic head according to claim 18, wherein the high-specific-resistance layer is formed on the upper face of the upper core layer and is covered with a protective film.

36. A thin-film magnetic head according to claim 35, wherein the protective film comprises one of a NiFe alloy, elemental Ni, and a NiP alloy.

37. A thin-film magnetic head according to claim 18, wherein the high-specific-resistance layer is formed at a portion other than a magnetic path-forming region toward the gap layer on at least one of the lower face of the upper core layer and the upper face of the lower core layer.

38. A thin-film magnetic head comprising:
a gap layer,
a magnetic pole layer optionally provided on one face of the gap layer;
a lower core layer;
an upper core layer, the lower core layer and the upper core layer facing each other and being separated by the gap layer;
a coil layer for applying a recording magnetic field to the lower core layer and the upper core layer; and
an insulating layer formed on the lower core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
wherein the magnetic pole layer is a high $B_s$ layer having a saturation magnetic flux density $B_s$ which is higher than the saturation magnetic flux density $B_s$ of the soft magnetic layer;
wherein the insulating layer has a groove having a width in the track width direction extending in the height direction from an opposing face opposing a recording medium, and the groove includes the high $B_s$ layer and the gap layer therein; and
wherein the soft magnetic layer and the high $B_s$ layer comprise magnetic materials containing the same components including Fe, and the Fe content in the high $B_s$ layer is higher than the Fe content in the soft magnetic layer.

39. A thin-film magnetic head according to claim 38, wherein the soft magnetic layer has a saturation magnetic flux density $B_s$ which is higher than the saturation magnetic flux density $B_s$ of the high-specific-resistance layer.

40. A thin-film magnetic head according to claim 39, wherein the soft magnetic layer and the high-specific-resistance layer comprise magnetic materials containing the same components including Fe in at least one of the upper core layer and the lower core layer, and the Fe content in the soft magnetic layer is higher than the Fe content in the high-specific-resistance layer.

41. A thin-film magnetic head according to claim 38, wherein at least one of the soft magnetic layer, the high-specific-resistance layer, and the high $B_s$ layer comprises a soft magnetic material having a composition which is represented by $Co_xFe_y$ and satisfies one of the pair of relationships $20 \leq x \leq 40$ and $60 \leq y \leq 80$ and the pair of relationships $86 \leq x \leq 92$ and $8 \leq y \leq 14$, and $x+y=100$, wherein x and y represent Co and Fe contents, respectively, by atomic percent.

42. A thin-film magnetic head according to claim 41, wherein at least one of the soft magnetic layer and the high $B_s$ layer comprises the soft magnetic material.

43. A thin-film magnetic head according to claim 42, wherein at least one of the soft magnetic layer, the high-specific-resistance layer, and the high $B_s$ layer comprises a soft magnetic material having a composition which is represented by $Co_xFe_yNi_z$ and satisfies the relationships $0.1 \leq x \leq 15$, $38 \leq y \leq 60$, $40 \leq z \leq 62$, and $x+y+z=100$, wherein x, y, and z represent Co, Fe, and Ni contents, respectively, by percent by weight.

44. A thin-film magnetic head according to claim 38, wherein at least one of the soft magnetic layer, the high-specific-resistance layer, and the high $B_s$ layer comprises a soft magnetic material having a composition which is represented by $Co_xFe_yNi_zX_w$ and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

45. A thin-film magnetic head according to claim 38, wherein at least one of the soft magnetic layer, the high-specific-resistance layer, and the high $B_s$ layer comprises a soft magnetic material having a composition which is represented by $Ni_xFe_y$ and satisfies the relationships $10 \leq x \leq 70$, $30 \leq y \leq 90$, and $x+y=100$, wherein x and y represent Ni and Fe contents, respectively, by atomic percent.

46. A thin-film magnetic head according to claim 45, wherein the high-specific-resistance layer comprises the soft magnetic material.

47. A thin-film magnetic head according to claim 46, wherein the centerline average roughness ($R_a$) of the surface of the soft magnetic material is not more than 120 Å.

48. A thin-film magnetic head according to claim 38, wherein at least one of the soft magnetic layer, the high-specific-resistance layer, and the high $B_s$ layer comprises a soft magnetic material having a composition which is represented by $Fe_aM_bO_c$ and satisfies the relationships $50 \leq a \leq 70$, $5 \leq b \leq 30$, $10 \leq c \leq 30$, and $a+b+c=100$, wherein a, b, and c represent Fe, M, and O contents, respectively, by atomic percent, and M is at least one element selected from the group consisting of Hf, Zr, Ti, V, Nb, Ta, Cr, Mo, and W.

49. A thin-film magnetic head according to claim 38, wherein the high-specific-resistance layer comprises a soft magnetic material comprising Ni, Fe, and N and having an average crystal grain size of not more than 80 Å, the Fe content being at least 30 percent by weight.

50. A thin-film magnetic head according to claim 38, wherein the high-specific-resistance layer comprises a soft magnetic material having a composition which is represented by $Ni_xFe_yNb_z$, wherein x, y, and z indicate atomic percent and satisfy the relationships $76 \leq x \leq 84$, $8 \leq y \leq 15$, $5 \leq z \leq 12$, and $x+y+z=100$.

51. A thin-film magnetic head according to claim 38, wherein the high-specific-resistance layer comprises one of NiFeP and FeNiPN.

52. A thin-film magnetic head according to claim 38, wherein at least one of the soft magnetic layer and the high $B_s$ layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

53. A thin-film magnetic head according to claim 38, wherein at least one of the soft magnetic layer and the high $B_s$ layer comprises a soft magnetic material having a composition which is represented by the formula $Ni_{1-x}Fe_x$ and has an average crystal grain size of not more than 105 Å, wherein the Fe content is in a range of 60 to 90 percent by weight.

54. A thin-film magnetic head according to claim 53, wherein the centerline average roughness ($R_a$) of the surface of the soft magnetic film is not more than 25 Å.

55. A thin-film magnetic head according to claim 38, wherein the high-specific-resistance layer is formed on the upper face of the upper core layer and is covered with a protective film.

56. A thin-film magnetic head according to claim 55, wherein the protective film comprises one of a NiFe alloy, elemental Ni, and a NiP alloy.

57. A thin-film magnetic head according to claim 38, wherein the high-specific-resistance layer is formed at a portion other than a magnetic path-forming region toward the gap layer on at least one of the lower face of the upper core layer and the upper face of the lower core layer.

58. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer; and wherein at least one of the soft magnetic layer, the high-specific-resistance layer, and the high $B_s$ layer comprises a soft magnetic material having a composition which is represented by $Co_xFe_yNi_z$ and satisfies the relationships $0.1 \leq x \leq 15$, $38 \leq y \leq 60$, $40 \leq z \leq 62$, and $x+y+z=100$, wherein x, y, and z represent Co, Fe, and Ni contents, respectively, by percent by weight.

59. A thin-film magnetic head comprising a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer; and wherein at least one of the soft magnetic layer, the high-specific-resistance layer, and the high $B_s$ layer comprises a soft magnetic material having a composition which is represented by $Co_xFe_yNi_zX_w$ and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

60. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer; and wherein at least one of the soft magnetic layer, the high-specific-resistance layer, and the high $B_s$ layer comprises a soft magnetic material having a composition which is represented by $Fe_aM_bO_c$ and satisfies the relationships $50 \leq a \leq 70$, $5 \leq b \leq 30$, $10 \leq c \leq 30$, and a +b+c=100, wherein a, b, and c represent Fe, M, and O contents, respectively, by atomic percent, and M is at least one element selected from the group consisting of Hf, Zr, Ti, V, Nb, Ta, Cr, Mo, and W.

61. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the high-specific-resistance layer comprises a soft magnetic material comprising Ni, Fe, and N and having an average crystal grain size of not more than 80 Å, the Fe content being at least 30 percent by weight.

62. A thin-film magnetic head according to claim 61, wherein the high-specific-resistance layer is formed on the upper face of the upper core layer and is covered with a protective film.

63. A thin-film magnetic head according to claim 62, wherein the protective film comprises one of a NiFe alloy, elemental Ni, and a NiP alloy.

64. A thin-film magnetic head according to claim 61, wherein the high-specific-resistance layer is formed at a portion other than a magnetic path-forming region toward the gap layer on at least one of the lower face of the upper core layer and the upper face of the lower core layer.

65. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher-than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer;

wherein at least one of the soft magnetic layer, the high-specific-resistance layer, and the high $B_s$ layer comprises a soft magnetic material having a composition which is represented by $Ni_xFe_y$ and satisfies the relationships $10 \leq x \leq 70$, $30 \leq y \leq 90$, and $x+y=100$, wherein x and y represent Ni and Fe contents, respectively, by atomic percent;

wherein the high-specific-resistance layer comprises the soft magnetic material; and wherein the centerline average roughness ($R_a$) of the surface of the soft magnetic material is not more than 120 Å.

66. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the high-specific-resistance layer comprises a soft magnetic material having a composition which is represented by $Ni_xFe_yNb_z$, wherein x, y, and z indicate atomic percent and satisfy the relationships $76 \leq x \leq 84$, $8 \leq y \leq 15$, $5 \leq z \leq 12$, and x+y+z 100.

67. A thin-film magnetic head according to claim 66, wherein the high-specific-resistance layer is formed on the upper face of the upper core layer and is covered with a protective film.

68. A thin-film magnetic head according to claim 67, wherein the protective film comprises one of a NiFe alloy, elemental Ni, and a NiP alloy.

69. A thin-film magnetic head according to claim 66, wherein the high-specific-resistance layer is formed at a portion other than a magnetic path-forming region toward the gap layer on at least one of the lower face of the upper core layer and the upper face of the lower core layer.

70. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the high-specific-resistance layer comprises one of NiFeP and FeNiPN.

71. A thin-film magnetic head according to claim 70, wherein the high-specific-resistance layer is formed on the upper face of the upper core layer and is covered with a protective film.

72. A thin-film magnetic head according to claim 71, wherein the protective film comprises one of a NiFe alloy, elemental Ni, and a NiP alloy.

73. A thin-film magnetic head according to claim 70, wherein the high-specific-resistance layer is formed at a portion other than a magnetic path-forming region toward the gap layer on at least one of the lower face of the upper core layer and the upper face of the lower core layer.

74. A thin-film magnetic head comprising:
a magnetic pole layer optionally provided on one face of the gap layer;
a lower core layer;
an upper core layer, the lower core layer and the upper core layer facing each other and being separated by the gap layer; and
a coil layer for applying a recording magnetic field to the lower core layer and the upper core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
wherein the magnetic pole layer is a high $B_s$ layer having a saturation magnetic flux density $B_s$ which is higher than the saturation magnetic flux density $B_s$ of the soft magnetic layer; and
wherein the soft magnetic layer and the high $B_s$ layer comprise a soft magnetic material having a composition which is represented by $Co_xZr_yNb_z$ and satisfies the relationships $1.5 \leq y \leq 13$, $6.5 \leq z \leq 15$, $1 \leq (y/z) \leq 2.5$, and $x+y+z=100$, wherein x, y, and z represent Co, Zr, and Nb contents, respectively, by atomic percent.

75. A thin-film magnetic head comprising:
a gap layer,
a magnetic pole layer optionally provided on one face of the gap layer;
a lower core layer;
an upper core layer, the lower core layer and the upper core layer facing each other and being separated by the gap layer; and
a coil layer for applying a recording magnetic field to the lower core layer and the upper core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
wherein the magnetic pole layer is a high $B_s$ layer having a saturation magnetic flux density $B_s$ which is higher than the saturation magnetic flux density $B_s$ of the soft magnetic layer; and
wherein the soft magnetic layer and the high $B_s$ layer comprise a soft magnetic material having a composition which is represented by $Co_xHf_yNb_z$ and satisfies the relationships $1.5 \leq y \leq 13$, $6.5 \leq z \leq 15$, $1 \leq (y/z) \leq 2.5$, and $x+y+z=100$, wherein x, y, and z represent Co, Hf, and Nb contents, respectively, by atomic percent.

76. A thin-film magnetic head comprising:
a gap layer,
a magnetic pole layer optionally provided on one face of the gap layer;
a lower core layer;
an upper core layer, the lower core layer and the upper core layer facing each other and being separated by the gap layer; and
a coil layer for applying a recording magnetic field to the lower core layer and the upper core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer:
wherein the magnetic pole layer is a high $B_s$ layer having a saturation magnetic flux density $B_s$ which is higher than the saturation magnetic flux density $B_s$ of the soft magnetic layer; and
wherein at least one of the soft magnetic layer and the high $B_s$ layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

77. A thin-film magnetic head comprising:
a gap layer,
a magnetic pole layer optionally provided on one face of the gap layer;
a lower core layer;
an upper core layer, the lower core layer and the upper core layer facing each other and being separated by the gap layer; and
a coil layer for applying a recording magnetic field to the lower core layer and the upper core layer;
wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;
wherein the magnetic pole layer is a high $B_s$ layer having a saturation magnetic flux density $B_s$ which is higher than the saturation magnetic flux density $B_s$ of the soft magnetic layer; and
wherein at least one of the soft magnetic layer and the high $B_s$ layer comprises a soft magnetic material having a composition comprising at least one element T selected from Fe and Co as the major component, at least one element X selected from Si and Al, at least one element M selected from the group consisting of Ti, Zr, Hf, V, Ta, Mo, and W, at least one element Z selected from C and N, and at least one element Q selected from the group consisting of Cr, Re, Rh, Ni, Pd, Pt, and Au, the composition includes a crystalline phase primarily composed of the element T, and a crystalline phase composed of at least one of carbide.and nitride of the element M, and is composed of microcrystallites having an average crystal grain size of not more than 40 nm on the whole, wherein the ratio of the average crystal grain size d of the M carbide and the M nitride to the average crystal grain size D of the crystalline phase of the element T is in a range of $0.05 \leq d/D \leq 0.4$, and the composition is represented by the formula $T_a X_b M_c Z_d Q_e$, wherein a, b, c, d, and e represent atomic percent and satisfy the relationships $0 \leq b \leq 25$, $1c \leq 10$, $5 \leq d \leq 15$, $0 \leq e \leq 10$, and a +b+c+d+e=100.

78. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer; and wherein at least one of the soft magnetic layer and the high $B_s$ layer comprises a soft magnetic material having a composition comprising at least one element T selected from Fe and Co as the major component, Si, Al, at least one element M selected from the group consisting of Zr, Hf. Nb, and Ta, at least one element Z selected from C and N, and at least one element Q selected from the group consisting of Cr, Ti, Mo, W, V, Re, Ru, Rh, Ni, Pd, Pt, and Au, the composition includes a body centered cubic microcrystalline phase primarily composed of the element T and having an average crystal grain size of not more than 40 nm, wherein at least one element of Si and Al and the element Q are dissolved therein, and a crystalline phase of at least one of M carbide and M nitride which is precipitated at the grain boundaries of the microcrystalline phase, wherein the composition is represented by the formula $T_a Si_b Al_c M_d Z_e Q_f$, wherein a, b, c, d, e, and f represent atomic percent and satisfy the relationships $8 \leq b \leq 15$, $0 \leq c \leq 10$, $1 \leq d \leq 10$, $1 \leq e \leq 10$, $0 \leq f \leq 15$, and a+b+c+d+e+f=100.

79. A thin-film magnetic head comprising:

a gap layer, a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein the magnetic pole layer is a high $B_s$ layer having a saturation magnetic flux density $B_s$ which is higher than the saturation magnetic flux density $B_s$ of the soft magnetic layer; and wherein at least one of the soft magnetic layer and the high $B_s$ layer comprises a soft magnetic material having a composition which is represented by the formula $Ni_{1-x}Fe_x$ and has an average crystal grain size of not more than 105 Å, wherein the Fe content is in a range of 60 to 90 percent by weight.

80. A thin-film magnetic head according to claim 79 wherein the centerline average roughness ($R_a$) of the surface of the soft magnetic film is not more than 25 Å.

81. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein at least one of the soft magnetic layer and the high-specific-resistance layer comprises a soft magnetic material having a composition which is represented by $Co_x Fe_y Ni_z$ and satisfies the relationships $0.1 \leq x \leq 15$, $38 \leq y \leq 60$, $40 \leq z \leq 62$, and x+y+z=100, wherein x, y, and z represent Co, Fe, and Ni contents, respectively, by percent by weight.

82. A thin-film magnetic head according to claim 81, wherein the high-specific-resistance layer is formed on the upper face of the upper core layer and is covered with a protective film.

83. A thin-film magnetic head according to claim 82, wherein the protective film comprises one of a NiFe alloy, elemental Ni, and a NiP alloy.

84. A thin-film magnetic head according to claim 81, wherein the high-specific-resistance layer is formed at a portion other than a magnetic path-forming region toward the gap layer on at least one of the lower face of the upper core layer and the upper face of the lower core layer.

85. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein at least one of the soft magnetic layer and the high-specific-resistance layer comprises a soft magnetic material having a composition which is represented by $Co_xFe_yNi_zX_w$, and satisfies the relationships $0.1 \leq x \leq 15$, $38 \leq y \leq 60$, $40 \leq z \leq 62$, $0.1 \leq w \leq 3$, and $x+y+z+w=100$, wherein x, y, z, and w represent Co, Fe, Ni, and X contents, respectively, by percent by weight, and X is at least one element selected from the group consisting of Mo, Cr, Pd, B, and In.

86. A thin-film magnetic head according to claim 85, wherein the high-specific-resistance layer is formed on the upper face of the upper core layer and is covered with a protective film.

87. A thin-film magnetic head according to claim 86, wherein the protective film comprises one of a NiFe alloy, elemental Ni, and a NiP alloy.

88. A thin-film magnetic head according to claim 85, wherein the high-specific-resistance layer is formed at a portion other than a magnetic path-forming region toward the gap layer on at least one of the lower face of the upper core layer and the upper face of the lower core layer.

89. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer;

wherein at least one of the soft magnetic layer and the high-specific-resistance layer comprises a soft magnetic material having a composition which is represented by $Ni_xFe_y$ and satisfies the relationships $10 \leq x \leq 70$, $30 \leq y \leq 90$, and $x+y=100$, wherein x and y represent Ni and Fe contents, respectively, by atomic percent;

wherein the high-specific-resistance layer comprises the soft magnetic material; and wherein the centerline average roughness ($R_a$) of the surface of the soft magnetic material is not more that 120 Å.

90. A thin-film magnetic head according to claim 89, wherein the high-specific-resistance layer is formed on the upper face of the upper core layer and is covered with a protective film.

91. A thin-film magnetic head according to claim 90, wherein the protective film comprises one of a NiFe alloy, elemental Ni, and a NiP alloy.

92. A thin-film magnetic head according to claim 89, wherein the high-specific-resistance layer is formed at a portion other than a magnetic path-forming region toward the gap layer on at least one of the lower face of the upper core layer and the upper face of the lower core layer.

93. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein at least one of the soft magnetic layer and the high-specific-resistance layer comprises a soft magnetic material having a composition which is represented by $Fe_aM_bO_c$ and satisfies the relationships $50 \leq a \leq 70$, $5 \leq b \leq 30$, $10 \leq c \leq 30$, and $a+b+c=100$, wherein a, b, and c represent Fe, M, and O contents, respectively, by atomic percent, and M is at least one element selected from the group consisting of Hf, Zr, Ti, V, Nb, Ta, Cr, Mo, and W.

94. A thin-film magnetic head according to claim 93, wherein the high-specific-resistance layer is formed on the upper face of the upper core layer and is covered with a protective film.

95. A thin-film magnetic head according to claim 94, wherein the protective film comprises one of a NiFe alloy, elemental Ni, and a NiP alloy.

96. A thin-film magnetic head according to claim 93, wherein the high-specific-resistance layer is formed at a portion other than a magnetic path-forming region toward the gap layer on at least one of the lower face of the upper core layer and the upper face of the lower core layer.

97. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition which is represented by $Co_xZr_yNb_z$ and satisfies the relationships $1.5 \leq y \leq 13$, $6.5 \leq z \leq 15$, $1 \leq (y/z) \leq 2.5$, and $x+y+z=100$, wherein x, y, and z represent Co, Zr, and Nb contents, respectively, by atomic percent.

98. A thin-film magnetic head according to claim 97, wherein the high-specific-resistance layer is formed on the upper face of the upper core layer and is covered with a protective film.

99. A thin-film magnetic head according to claim 98, wherein the protective film comprises one of a NiFe alloy, elemental Ni, and a NiP alloy.

100. A thin-film magnetic head according to claim 97, wherein the high-specific-resistance layer is formed at a portion other than a magnetic path-forming region toward the gap layer on at least one of the lower face of the upper core layer and the upper face of the lower core layer.

101. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition which is represented by CoxHfyNbz and satisfies the relationships $1.5 \leq y \leq 13$, $6.5 \leq z \leq 15$, $1 \leq (y/z) \leq 2.5$, and $x+y+z=100$, wherein x, y, and z represent Co, Hf, and Nb contents, respectively, by atomic percent.

102. A thin-film magnetic head according to claim 101, wherein the high-specific-resistance layer is formed on the upper face of the upper core layer and is covered with a protective film.

103. A thin-film magnetic head according to claim 102, wherein the protective film comprises one of a NiFe alloy, elemental Ni, and a NiP alloy.

104. A thin-film magnetic head according to claim 101, wherein the high-specific-resistance layer is formed at a portion other than a magnetic path-forming region toward the gap layer on at least one of the lower face of the upper core layer and the upper face of the lower core layer.

105. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition comprising Fe as the major component, Co, and at least one element M selected from the group consisting of Hf, Zr, Ti, V, Nb, Ta, Cr, Mo, and W, the composition includes a crystalline phase primarily composed of Fe and a crystalline phase composed of carbides of the element M, and is composed of microcrystallites having an average crystal grain size of not more than 40 nm on the whole, wherein the ratio of the average crystal grain size d of the M carbides to the average crystal grain size D of the Fe crystalline phase is in a range of $0.05 \leq d/D \leq 0.4$, and the composition is represented by the formula $Fe_xM_yC_z$, wherein x, y, and z represents the Fe, M, and C contents by atomic percent, and satisfy the relationships $50 \leq x \leq 96$, $2 \leq y \leq 30$, $0.5 \leq z \leq 25$, and $x+y+z=100$.

106. A thin-film magnetic head according to claim 105, wherein the high-specific-resistance layer is formed on the upper face of the upper core layer and is covered with a protective film.

107. A thin-film magnetic head according to claim 106, wherein the protective film comprises one of a NiFe alloy, elemental Ni, and a NiP alloy.

108. A thin-film magnetic head according to claim 105, wherein the high-specific-resistance layer is formed at a portion other than a magnetic path-forming region toward the gap layer on at least one of the lower face of the upper core layer and the upper face of the lower core layer.

109. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition comprising at least one element T selected from Fe and Co as the major component, at least one element X selected from Si and Al, at least one element M selected from the group consisting of Ti, Zr, Hf, V, Ta, Mo, and W, at least one element Z selected from C and N, and at least one element Q selected from the group consisting of Cr, Re, Rh, Ni, Pd, Pt, and Au, the composition includes a crystalline phase primarily composed of the element T, and a crystalline phase composed of at least one of carbide and nitride of the element M, and is composed of microcrystallites having an average crystal grain size of not more than 40 nm on the whole, wherein the ratio of the average crystal grain size d of the M carbide and the M nitride to the average crystal grain size D of the crystalline phase of the element T is in a range of $0.05 \leq d/D \leq 0.4$, and the composition is represented by the formula $T_aX_bM_cZ_dQ_e$, wherein a, b, c, d, and e represent atomic percent and satisfy the relationships $0 \leq b \leq 25$, $1 \leq c \leq 10$, $5 \leq d \leq 15$, $0 \leq e \leq 10$, and $a+b+c+d+e=100$.

110. A thin-film magnetic head according to claim 109, wherein the high-specific-resistance layer is formed on the upper face of the upper core layer and is covered with a protective film.

111. A thin-film magnetic head according to claim 110, wherein the protective film comprises one of a NiFe alloy, elemental Ni, and a NiP alloy.

112. A thin-film magnetic head according to claim 109, wherein the high-specific-resistance layer is formed at a portion other than a magnetic path-forming region toward the gap layer on at least one of the lower face of the upper core layer and the upper face of the lower core layer.

113. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition comprising at least one element T selected from Fe and Co as the major component, Si, Al, at least one element M selected from the group consisting of Zr, Hf, Nb, and Ta, at least one element Z selected from C and N, and at least one element Q selected from the group consisting of Cr, Ti, Mo, W, V, Re, Ru, Rh, Ni, Pd, Pt, and Au, the composition includes a body centered cubic microcrystalline phase primarily composed of the element T and having an average crystal grain size of not more than 40 nm, wherein at least one element of Si and Al and the element Q are dissolved therein, and a crystalline phase of at least one of M carbide and M nitride which is precipitated at the grain boundaries of the microcrystalline phase, wherein the composition is represented by the formula $T_a Si_b Al_c M_d Z_e Q_f$, wherein a, b, c, d, e, and f represent atomic percent and satisfy the relationships $8 \leq b \leq 15$, $0 \leq c \leq 10$, $1 \leq d \leq 10$, $1 \leq e \leq 10$, $0 \leq f \leq 15$, and $a+b+c+d+e+f=100$.

114. A thin-film magnetic head according to claim 113, wherein the high-specific-resistance layer is formed on the upper face of the upper core layer and is covered with a protective film.

115. A thin-film magnetic head according to claim 114, wherein the protective film comprises one of a NiFe alloy, elemental Ni, and a NiP alloy.

116. A thin-film magnetic head according to claim 113, wherein the high-specific-resistance layer is formed at a portion other than a magnetic path-forming region toward the gap layer on at least one of the lower face of the upper core layer and the upper face of the lower core layer.

117. A thin-film magnetic head comprising:

a gap layer;

a magnetic pole layer optionally provided on one face of the gap layer;

a lower core layer;

an upper core layer, the lower core layer and the upper core layer facing each other and being separated by the gap layer; and a coil layer for applying a recording magnetic field to the lower core layer and the upper core layer;

wherein at least one of the lower core layer and the upper core layer comprises a soft magnetic layer and at least one high-specific-resistance layer formed on at least one of the upper face and the lower face of the soft magnetic layer, and the high-specific-resistance layer has a specific resistance which is higher than the specific resistance of the soft magnetic layer; and wherein the soft magnetic layer comprises a soft magnetic material having a composition which is represented by the formula $Ni_{1-x}Fe_x$ and has an average crystal grain size of not more than 105 Å, wherein the Fe content is in a range of 60 to 90 percent by weight.

118. A thin-film magnetic head according to claim 117, wherein the centerline average roughness (Ra) of the surface of the soft magnetic film is not more than 25 Å.

119. A thin-film magnetic head according to claim 117, wherein the high-specific-resistance layer is formed on the upper face of the upper core layer and is covered with a protective film.

120. A thin-film magnetic head according to claim 119, wherein the protective film comprises one of a NiFe alloy, elemental Ni, and a NiP alloy.

121. A thin-film magnetic head according to claim 117, wherein the high-specific-resistance layer is formed at a portion other than a magnetic path-forming region toward the gap layer on at least one of the lower face of the upper core layer and the upper face of the lower core layer.

* * * * *

UNITED STATES PATENT AND TRADEMARK OFFICE
CERTIFICATE OF CORRECTION

PATENT NO. : 6,538,845 B1
DATED : March 25, 2003
INVENTOR(S) : Toshinori Watanabe et al.

It is certified that error appears in the above-identified patent and that said Letters Patent is hereby corrected as shown below:

<u>Title page,</u>
Item [57], ABSTRACT,
Line 4, delete "softer" and substitute -- soft -- in its place.

<u>Column 18,</u>
Line 5, immediately after "and" delete "," (comma).
Line 34, delete "NixFey" and substitute -- $Ni_xFe_y$ -- in its place.

<u>Column 25,</u>
Line 55, delete "higher-than" and substititute -- higher than -- in its place.

<u>Column 26,</u>
Line 28, delete "x+y+z 100." and substitute -- x+y+z=100. -- in its place.

<u>Column 28,</u>
Line 65, delete "carbide.and" and substitute -- carbide and -- in its place.

<u>Column 29,</u>
Line 7, delete "1c≦10," and substitute -- 1≦c≦10, -- in its place.
Line 8, delete "a +b+c+d+e=100." and substitute -- a+b+c+d+e=100. -- in its place.
Line 36, delete "Hf." and substitute -- Hf, -- in its place.

<u>Column 30,</u>
Line 13, immediately after "79" insert -- , -- (comma).

Signed and Sealed this

Sixteenth Day of September, 2003

JAMES E. ROGAN
*Director of the United States Patent and Trademark Office*